US009531970B2

(12) United States Patent
Haji-Khamneh et al.

(10) Patent No.: US 9,531,970 B2
(45) Date of Patent: Dec. 27, 2016

(54) IMAGING SYSTEMS AND METHODS USING SQUARE IMAGE SENSOR FOR FLEXIBLE IMAGE ORIENTATION

(71) Applicant: OmniVision Technologies, Inc., Santa Clara, CA (US)

(72) Inventors: Bahman Haji-Khamneh, San Jose, CA (US); Harish Iyer, San Jose, CA (US); Vinoo Margasahayam, Fremont, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 91 days.

(21) Appl. No.: 14/262,180

(22) Filed: Apr. 25, 2014

(65) Prior Publication Data

US 2014/0320715 A1    Oct. 30, 2014

Related U.S. Application Data

(60) Provisional application No. 61/816,612, filed on Apr. 26, 2013.

(51) Int. Cl.
*H04N 5/369*    (2011.01)
*H04N 5/232*    (2006.01)

(52) U.S. Cl.
CPC .......... *H04N 5/369* (2013.01); *H04N 5/23229* (2013.01)

(58) Field of Classification Search
CPC  H04N 5/369; H04N 5/23229; H04N 5/23216; H04N 5/23245; H04N 5/23296; H04N 5/23293; G06F 3/0346; G06F 2200/1614
See application file for complete search history.

(56) References Cited

U.S. PATENT DOCUMENTS 5,900,909 A * 5/1999 Parulski ............... H04N 1/2112
                                                    348/231.6
6,061,467 A * 5/2000 Michael .................. G06T 7/001
                                                    257/E21.53

(Continued)

FOREIGN PATENT DOCUMENTS

TW           201130301 A1    9/2011

OTHER PUBLICATIONS

Taiwanese Patent Application 103115093 Notice of Allowance dated Mar. 25, 2016, 2 pages.

(Continued)

*Primary Examiner* — Luong T Nguyen
(74) *Attorney, Agent, or Firm* — Lathrop & Gage LLP

(57) ABSTRACT

An imaging system for generating flexibly oriented electronic images includes an image sensor having a square pixel array, imaging optics for forming an optical image on at least a portion of the square pixel array, wherein the portion is within an image circle of the imaging optics and includes at least two rectangular sub-portions differing from each other in aspect ratio and/or orientation, and a processing module capable of generating an electronic image from each of the at least two rectangular sub-portions. An imaging method for generating electronic images of flexible orientation, using a square image sensor pixel array, includes forming an optical image on at least a portion of the square image sensor pixel array, selecting, according to a desired orientation, a rectangular sub-portion of the at least a portion of the square image sensor pixel array, and generating a final electronic image from the sub-portion.

21 Claims, 17 Drawing Sheets

(56) References Cited

U.S. PATENT DOCUMENTS

| | | | | |
|---|---|---|---|---|
| 6,972,795 B1* | 12/2005 | Etoh | ............... | H01L 27/14806 257/E27.151 |
| 6,987,532 B1* | 1/2006 | Kawahara | ............. | H04N 5/232 348/220.1 |
| 8,233,052 B2* | 7/2012 | Augusto | ........... | H01L 27/14603 348/207.99 |
| 2006/0082657 A1* | 4/2006 | Meier | ................ | H04N 5/2253 348/208.7 |
| 2006/0152609 A1* | 7/2006 | Prentice | ............. | G06T 1/0007 348/272 |
| 2008/0088712 A1* | 4/2008 | Craig | ................ | G06T 3/0093 348/222.1 |
| 2010/0074559 A1* | 3/2010 | Satou | ................ | G06T 3/4007 382/300 |

OTHER PUBLICATIONS

Taiwanese Patent Application 103115093 Office Action dated Dec. 25, 2015, 8 pages.

\* cited by examiner

IMAGING SYSTEMS AND METHODS USING SQUARE IMAGE SENSOR FOR FLEXIBLE IMAGE ORIENTATION

CROSS-REFERENCE TO RELATED APPLICATIONS

The present application claims the benefit of priority to U.S. Provisional Application No. 61/816,612 filed Apr. 26, 2013, which is incorporated herein by reference in its entirety.

BACKGROUND

Common digital cameras use an image sensor with an oblong rectangular pixel array. Such digital cameras are used to capture images of landscape orientation, where the image width is greater than the image height, or portrait orientation, where the image width is less than the image height. A typical image sensor pixel array has aspect ratio four to three, such that the one side length of the pixel array is a factor of 4/3 longer than the other side length of the pixel array.

Today, nearly all mobile phones include at least one image sensor such that the mobile phone can function as a digital camera for taking photos and recording videos. Handheld mobile phones are usually held such that the display is in a portrait orientation, which means that the image sensor captures images of a scene in portrait orientation. To get a photo or video in landscape orientation, the mobile phone is rotated by ninety degrees such that the display is in a landscape orientation. Landscape orientation is preferred for recording of videos, since video playback usually happens on a landscape orientation display such as a television or a computer screen. For this reason, standard video formats are horizontal.

SUMMARY

In an embodiment, an imaging system for generating flexibly oriented electronic images includes (a) an image sensor having a square pixel array, (b) imaging optics for forming an optical image on at least a portion of the square pixel array, wherein the portion is within an image circle of the imaging optics and the portion includes at least two rectangular sub-portions differing from each other in at least one of aspect ratio and orientation, and (c) a processing module capable of generating an electronic image from each of the at least two rectangular sub-portions.

In an embodiment, an imaging method for generating electronic images of flexible orientation using a square image sensor pixel array includes (a) forming an optical image on at least a portion of the square image sensor pixel array, (b) selecting, according to a desired orientation, a rectangular sub-portion of the at least a portion of the square image sensor pixel array, and (c) generating a final electronic image from the sub-portion.

DETAILED DESCRIPTION OF THE EMBODIMENTS

Disclosed herein are imaging systems and methods with flexible image-orientation capability. These systems and methods utilize an image sensor with a square pixel array to, for example, take photos or record videos in both landscape and portrait orientation using the same orientation of the imaging system. This eliminates the need for orienting the imaging system in a particular fashion to obtain a desired image orientation. A user operating a handheld camera device, based upon these imaging systems and methods, may hold the camera in the most comfortable or practical orientation, regardless of the desired image orientation. The orientation of generated electronic images is not limited to image orientations that are aligned with a side of the square pixel array. Rather, the presently disclosed imaging systems and methods for flexible image orientation may generate electronic images having any orientation in the plane of the square pixel array. In certain embodiments, the imaging system and methods further include a gravitational orientation sensor to achieve video-stabilization. Video-stabilization is advantageously implemented in handheld cameras to correct for changes in camera orientation during video recording. In such embodiments, the image system or method may detect changes in camera orientation and adjust the portion of the square pixel array from which individual video frames are generated. This may be done in real-time as the video is recorded, or in post-capture video processing. The presently disclosed imaging systems and methods for flexible image orientation further offer flexibility in terms of image format. In embodiments, the same imaging system or method is capable of generating electronic images of different aspect ratios including, for example, 4:3, 16:9, and 1:1.

Figure 1:
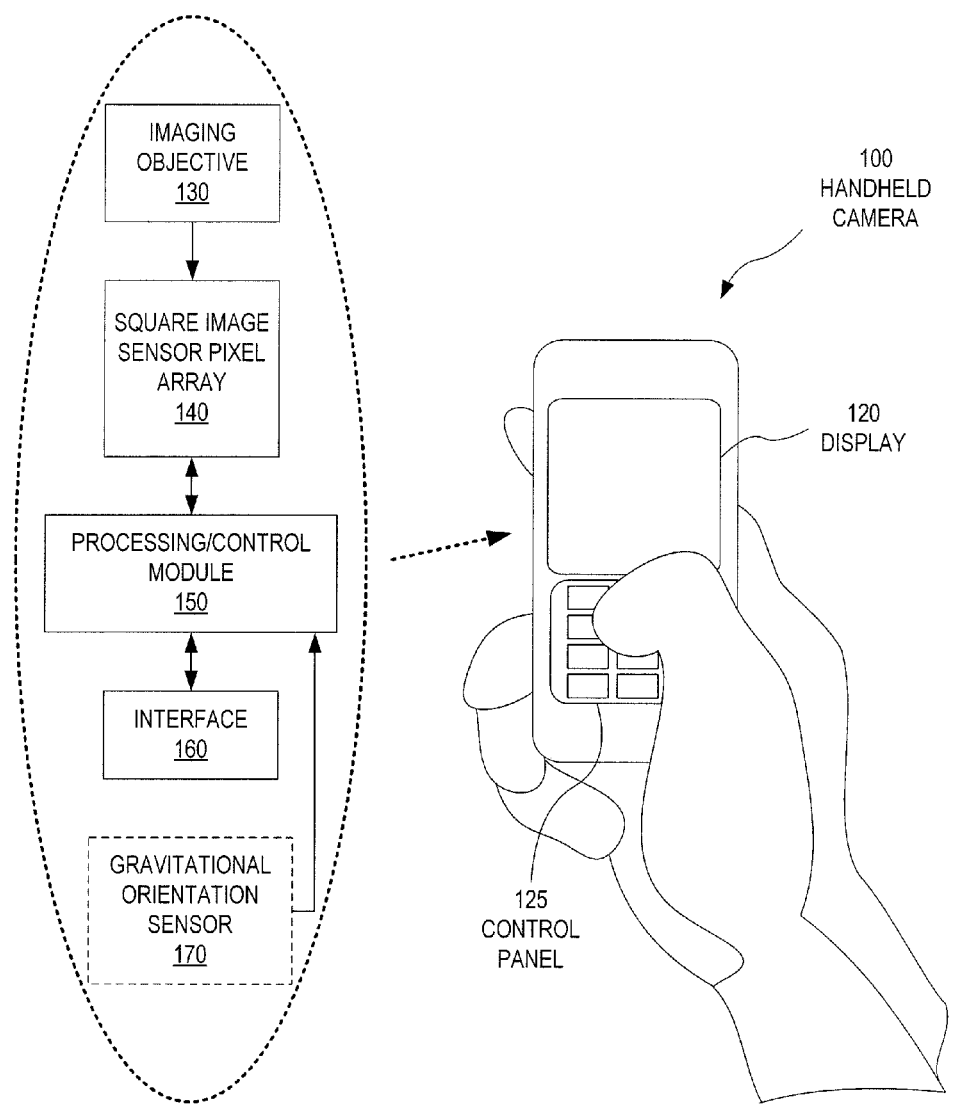
FIG. 1 illustrates a handheld imaging system that utilizes a square image sensor pixel array to provide flexible image orientation, according to an embodiment.

FIG. 1 illustrates one exemplary imaging system, a handheld camera 100, utilizing a square image sensor pixel array to provide flexible image orientation. Handheld camera 100 includes an imaging objective 130, a square image sensor pixel array 140, a processing/control module 150, and an interface 160. Interface 160 includes a display 120 and a control panel 125. Control panel 125 may be integrated with display 120 in, for example, a touch screen. A user may use handheld camera 100 to capture an image or a video stream. Imaging objective 130 forms an image on square image sensor pixel array 140. Processing/control module 150 processes images captured by square image sensor pixel array 140. In an embodiment, such processing is at least partly based on input received through interface 160. For example, a user may communicate a desired image orientation, such as portrait or landscape, to processing/control module 150 through control panel 125. In some embodiments, processing/control module 150 further controls at least portions of image capture by square image sensor pixel array 140. Display 120 may display capture images and/or processed images to the user.

In certain embodiments, handheld camera 100 further includes a gravitational orientation sensor 170. Gravitational orientation sensor 170 detects the gravitational orientation, i.e., the orientation relative to the direction of the gravitational force, of handheld camera 100 and thereby square image sensor pixel array 140. Gravitational orientation sensor 170 is communicatively coupled with processing/control module 150 such that processing/control module 150 may utilize a gravitational orientation detected by gravitational orientation sensor 170. For example, images captured by square image sensor pixel array 140 may be processed according to a gravitational orientation detected by gravitational orientation sensor 170. In another example, processing/control module 150 controls image captured by square image sensor pixel array 140 at least partially according to a gravitational orientation detected by gravitational orientation sensor 170.

Figure 2:
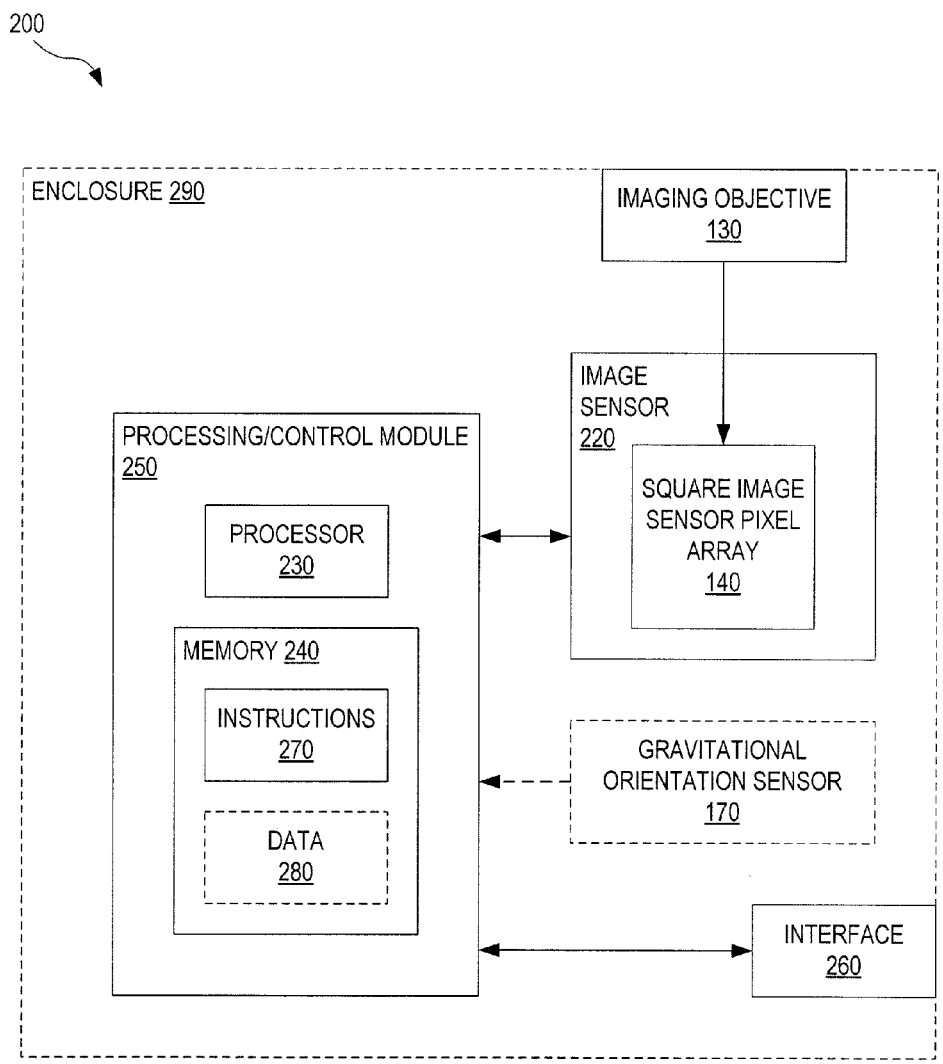
FIG. 2 illustrates an imaging system that utilizes a square image sensor pixel array to provide flexible image orientation, according to an embodiment.

FIG. 2 illustrates one exemplary imaging system 200 with a square image sensor pixel array for flexible image orientation. Imaging system 200 includes an image sensor 220. Image sensor 220 includes square image sensor pixel array 140 (FIG. 1). Imaging system 200 further includes imaging objective 130 (FIG. 1), for forming an optical image on at least a portion of square image sensor pixel array 140. Imaging system 200 also includes a processing/control module 250, communicatively coupled with image sensor 220, and an interface 260, communicatively coupled with processing/control module 250. Processing/control module 250 includes a processor 230 and a memory 240. Memory 240 includes machine-readable instructions 270, encoded in a non-volatile memory portion of memory 240, and, optionally, data storage 280. In certain embodiments, imaging system 200 further includes gravitational orientation sensor 170, which is communicatively coupled with processing/control module 250. Optionally imaging system 200 includes an enclosure 290, for example for holding and/or protecting elements of imaging system 200. Enclosure 290 may be a camera body.

Processing/control module 250 processes electronic images captured by square image sensor pixel array 140 according to one or more of instructions 270 and input received from interface 260. The electronic images are representative of an optical image formed upon square image sensor pixel array 140. For example, processing/control module 250 receives a desired image orientation, such as portrait or landscape, from interface 260 and processes electronic images received from image sensor 220 according to instructions 270 to produce electronic images of the desired orientation. During processing, processing/control module 250 may utilize data storage 280 for storage of, for example, captured images, processed images, and temporary data. Optionally, processing/control module 250 controls at least portions of the functionality of image sensor 220, such as aspects of image capture by square image sensor pixel array 140, according to one or more of instructions 270 and input received from interface 260. For example, processing/control module 250 controls image capture functionality of image sensor 220, according to instructions 270 and a desired image orientation received from interface 260, such that image sensor 220 generates an electronic image of the desired orientation. Processing/control module 250 may communicate captured and/or processed images to interface 260, and/or store such images to data storage 280.

In one embodiment, interface 260 is a user interface and includes, for example, display 120 and control panel 125 of FIG. 1. In another embodiment, interface 260 includes one or more of a touchscreen, a keypad, a voice interface, a wired or wireless connection to an external control system, such as a remote computer.

Handheld camera 100 of FIG. 1 is an embodiment of imaging system 200. Processing/control module 150 (FIG. 1) and interface 160 (FIG. 1) are embodiments of processing/control module 250 and interface 260, respectively.

In certain embodiments, imaging system 200 includes gravitational orientation sensor 170 (FIG. 1). Optional gravitational orientation sensor 170 is communicatively coupled with processing/control module 250, such that a detected gravitational orientation may be communicated to processing/control module 250 for use in image processing and/or image capture. In an exemplary usage scenario, processing/control module 250 receives a detected gravitational orientation from gravitation orientation sensor 170 and a desired image orientation, with respect to gravity, from interface 260. Processing/control module 250 then utilizes the detected gravitational orientation, the desired image orientation, and instructions 270 to generate an electronic image having the desired orientation with respect to gravity. Processing/control module 250 may apply this procedure to every electronic image of a video stream to produce a video stream that is orientation-stabilized with respect to gravity.

Imaging system 200 may be advantageously implemented, for example, in a handheld camera (as illustrated in FIG. 1), a camera mounted to a ski/bike/motorcycle helmet, or a camera mounted to a vehicle or another non-stationary object. Imaging system 200 may also be advantageously implemented in cameras having either a fixed orientation, such as webcams or security cameras, or a preferred orientation, such as mobile phones and other handheld cameras.

Figure 3:
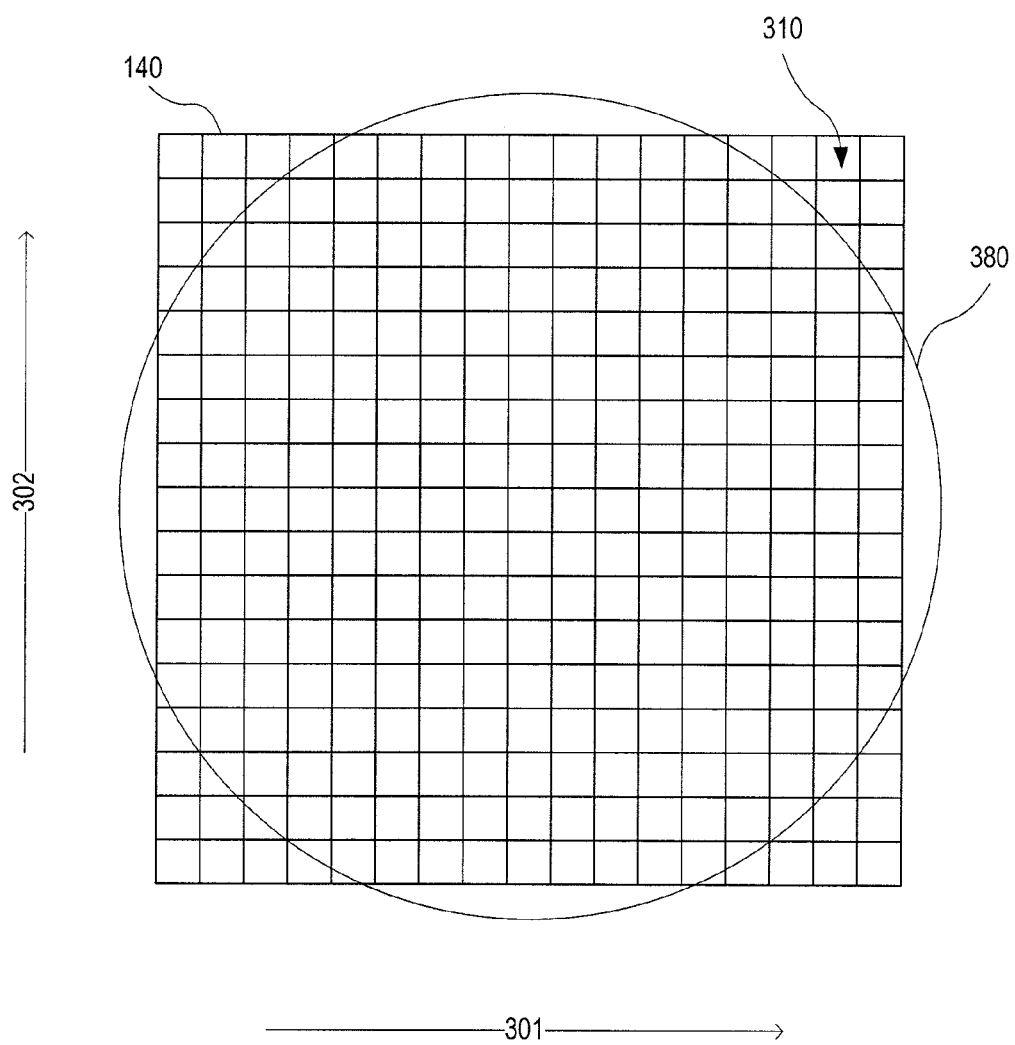
FIG. 3 illustrates a square image sensor pixel array, according to an embodiment.

FIG. 3 is a schematic illustration of square image sensor pixel array 140 of FIGS. 1 and 2. Square image sensor pixel array 140 includes a square array of photosensitive pixels that generate a signal in response to incident light. These signals may be processed to produce an electronic image representative of an optical image formed on square image sensor pixel array 140. In one embodiment, pixels of image sensor pixel array 140 may be monochrome pixels to provide a grayscale or black/white electronic image. In another embodiment, pixels of square image sensor pixel array 140 are color pixels, for example composed of a plurality of photosites sensitive to a plurality of different colors. In this embodiment, square image sensor pixel array 140 may be used to generate an electronic color image representative of an optical image formed on square image sensor pixel array 140. In one embodiment, square image sensor pixel array 140 is implemented in a complementary metal-oxide semiconductor (CMOS) image sensor. For example, image sensor 220 of FIG. 2 is a CMOS image sensor. In another embodiment, square image sensor pixel array 140 is implemented in a charge-couple device (CCD) image sensor. For example, image sensor 220 of FIG. 2 is a CCD image sensor.

In certain embodiments, pixels of square image sensor pixel array 140 are arranged in orthogonal rows and columns such that each column and each row includes N pixels, where N is an integer greater than one. The rows are oriented along a direction 301 and the columns are oriented along a direction 302 that is orthogonal to direction 301. In an embodiment, square image sensor pixel array 140 includes 4240×4240 pixels, i.e., each column and each row of square image sensor pixel array 140 includes 4240 pixels. The pixel pitch, i.e., the center-to-center distance between nearest neighbor pixels, may be 1.12 micron.

In the illustration in FIG. 3, image sensor pixel array 140 includes an array of elements 310. For clarity of illustration, only one element 310 is labeled in FIG. 3. Each element 310 may represent a single pixel or a group of pixels. FIG. 3 is not drawn to scale. Image sensor pixel array 140 may include a different number of elements 310 than shown in FIG. 3, without departing from the scope hereof.

Also illustrated in FIG. 3 is an image circle 380, which represents a boundary within which an optical image is formed in the plane of square image sensor pixel array 140. For example, image circle 380 may represent the area in the plane of square image sensor pixel array 140, within which imaging objective 130 (FIGS. 1 and 2) may form a useful optical image. Image circle 380 may be defined by the radius, from the optical axis of imaging objective 130 (FIGS. 1 and 2), at which the illumination strength drops below a specified threshold, as compared to the illumination strength at the intersection between the optical axis of imaging objective 130 (FIGS. 1 and 2) and square image sensor pixel array 140. The threshold may take on any value greater than or equal to zero and less than or equal to the illumination strength at the intersection of optical axis of imaging objective 130 (FIGS. 1 and 2) with square image sensor pixel array 140, without departing from the scope hereof. The properties of the imaging objective, for example imaging objective 130 (FIGS. 1 and 2), used to form an optical image on square image sensor pixel array 140, may be selected to produce an image circle 380 that allows for capture of images of a certain pixel resolution and aspect ratio. Exemplary embodiments are illustrated in FIGS. 4, 5, 6, and 10.

Figure 4:
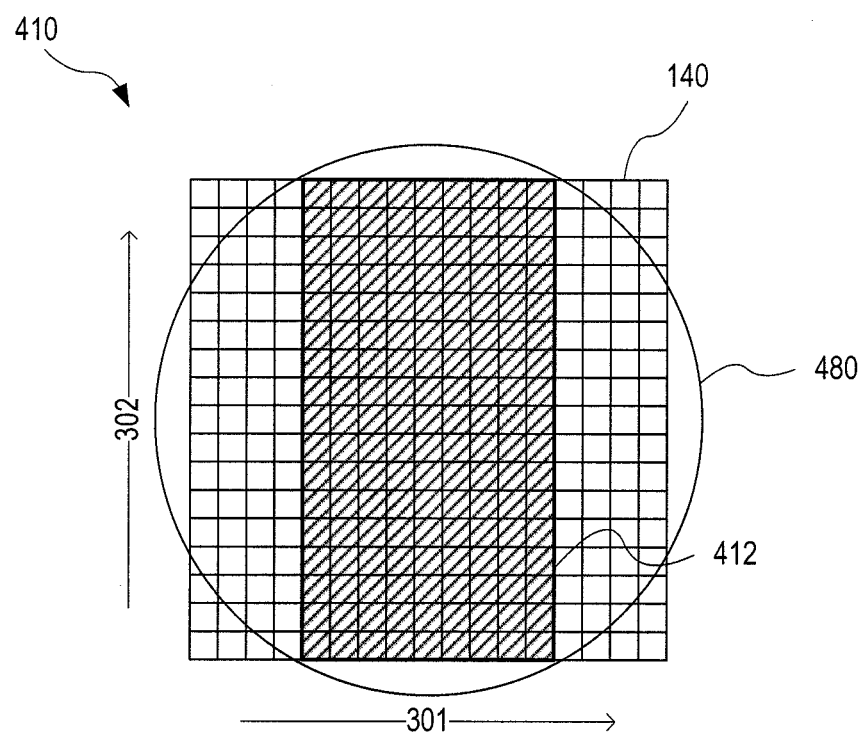
FIG. 4 illustrates how a square image sensor pixel array may facilitate generation of rectangular electronic images of two different orientations, according to an embodiment.
Figure 4:
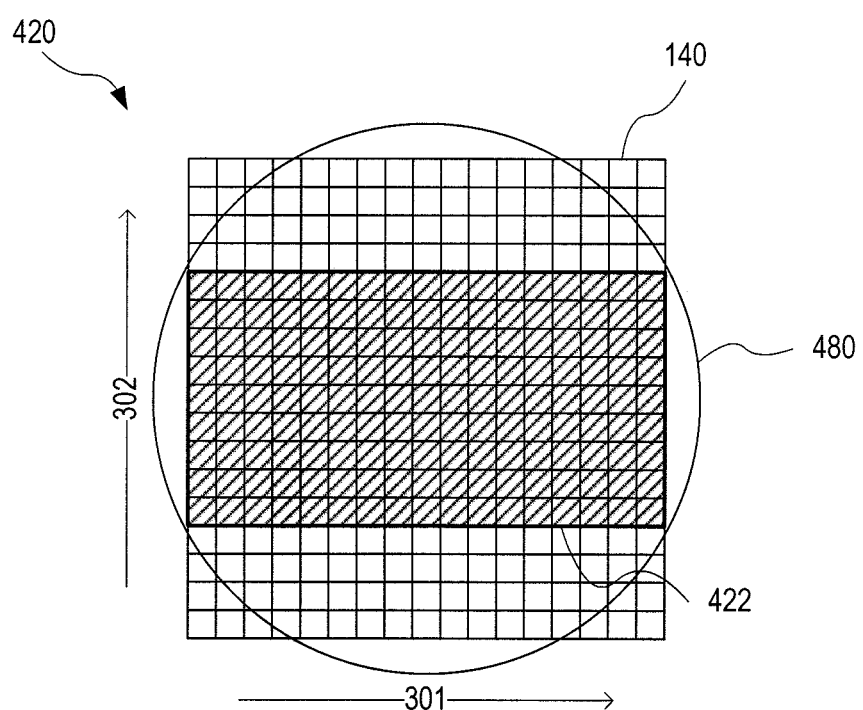

FIG. 4 schematically shows, in one exemplary embodiment, how square image sensor pixel array 140 (FIGS. 1 and 2) may facilitate generation of rectangular electronic images of two different orientations. Diagram 410 illustrates use of square image sensor pixel array 140 to generate a portrait-oriented electronic image where the longer dimension is parallel to direction 302. Diagram 420 illustrates use of square image sensor pixel array 140 to generate a landscape-oriented electronic image, where the longer dimension is parallel to direction 301. Diagrams 410 and 420 both illustrate an image circle 480 on square image sensor pixel array 140. Image circle 480 is an embodiment of image circle 380 (FIG. 3). Image circle 480 has size relative to the size of square image sensor pixel array 140 such that square image sensor pixel array 140 may be used to generate electronic images of aspect ratio 16:9, while utilizing the full extent of square image sensor pixel array 140 in the longer dimension of the electronic images. The aspect ratio 16:9 is often used for high-definition video, and matches the aspect ratio of commonly used television screens. The configurations illustrated in diagrams 410 and 420 may be achieved using imaging system 200 of FIG, with the properties of imaging objective 130 being selected to produce image circle 480.

Diagram 410 indicates a rectangular sub-portion 412 of the portion of square image sensor pixel array 140 located within image circle 480. Rectangular sub-portion 412 has aspect ratio 16:9 and is portrait-oriented such that the longer dimension of rectangular sub-portion 412 is parallel to direction 302. The longer dimension of rectangular sub-portion 412 utilizes the full extent of square image sensor pixel array 140. Diagram 420 indicates a rectangular sub-portion 422 of the portion of square image sensor pixel array 140 located within image circle 480. Rectangular sub-portion 422 has aspect ratio 16:9 and is landscape-oriented such that the longer dimension of rectangular sub-portion 412 is parallel to direction 301. The longer dimension of rectangular sub-portion 422 utilizes the full extent of square image sensor pixel array 140. Accordingly, by using, rectangular sub-portions 412 and 422, square image sensor pixel array 140 facilitates generation of both portrait and landscape oriented electronic images of aspect ratio 16:9 without having to reorient square image sensor pixel array 140.

FIG. 4 is not drawn to scale. Image sensor pixel array 140 may include a different number of elements 310 than shown in FIG. 4, without departing from the scope hereof. While image circle 480 is illustrated in FIG. 4 as being centered with respect to square image sensor pixel array 140, the center of image circle 480 may be offset from the center of square image sensor pixel array 140, without departing from the scope hereof.

Figure 5:
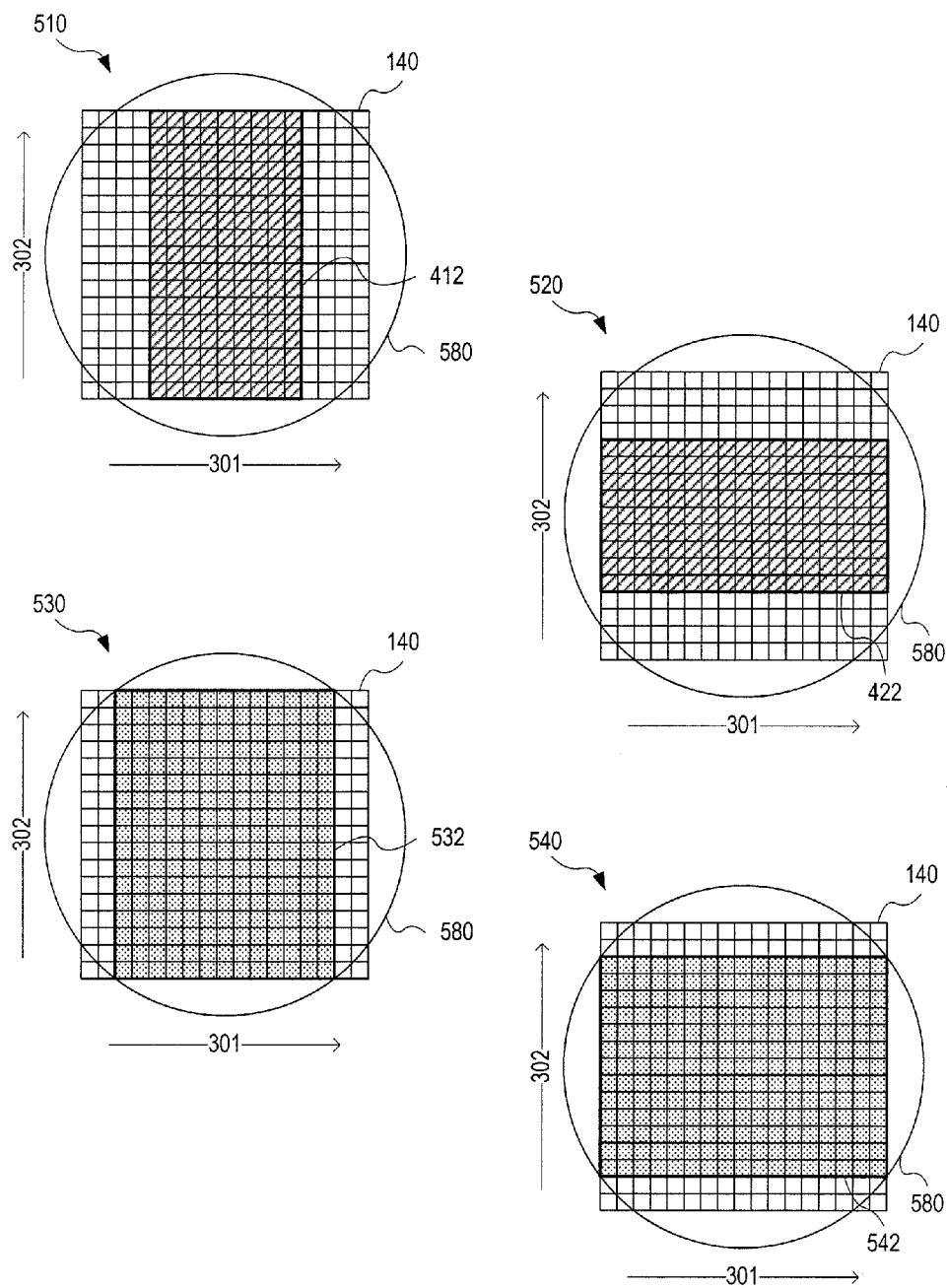
FIG. 5 illustrates how a square image sensor pixel array may provide rectangular electronic images of different orientations and of different aspect ratios, according to an embodiment.

FIG. 5 schematically shows, in one exemplary embodiment, how square image sensor pixel array 140 (FIGS. 1 and 2) may provide rectangular electronic images of different orientations and of different aspect ratios. Diagrams 510 and 520 respectively illustrate use of square image sensor pixel 140 to generate electronic images of same size and aspect ratio, but having portrait and landscape orientation. Similarly, diagrams 530 and 540 respectively illustrate use of square image sensor pixel 140 to generate electronic images of same size and aspect ratio, but having portrait and landscape orientation. However, the aspect ratio associated with diagrams 510 and 520 is different from the aspect ratio of diagrams 530 and 540.

Diagrams 510, 520, 530, and 540 show an image circle 580, which is an embodiment of image circle 380 (FIG. 3). Image circle 580 has size such that square image sensor pixel array 140 may be used to generate electronic images of aspect ratios 16:9 and 4:3, while utilizing the full extent of square image sensor pixel array 140 in the longer dimension of the electronic images. The aspect ratio 4:3 is commonly used for photos.

The configurations illustrated in diagrams 510, 520, 530, and 540 may be achieved using imaging system 200 of FIG, with the properties of imaging objective 130 being selected to produce image circle 580. Image circle 580 is larger than image circle 480 (FIG. 4). As compared to the configurations illustrated in FIG. 4, imaging objective 130, for the purpose of achieving the configurations of diagrams 510, 520, 530, and 540, may have properties that produce a larger image circle.

Diagram 510 indicates rectangular sub-portion 412 (FIG. 4) of the portion of square image sensor pixel array 140 located within image circle 580. Diagram 520 indicates rectangular sub-portion 422 (FIG. 4) of the portion of square image sensor pixel array 140 located within image circle 580. Diagram 530 indicates a rectangular sub-portion 532 of the portion of square image sensor pixel array 140 located within image circle 580. Rectangular sub-portion 532 has aspect ratio 4:3 and is portrait-oriented such that the longer dimension of rectangular sub-portion 532 is parallel to direction 302. The longer dimension of rectangular sub-portion 532 utilizes the full extent of square image sensor pixel array 140. Diagram 540 indicates a rectangular sub-portion 542 of the portion of square image sensor pixel array 140 located within image circle 580. Rectangular sub-portion 542 has aspect ratio 4:3 and is landscape-oriented such that the longer dimension of rectangular sub-portion 542 is parallel to direction 301. The longer dimension of rectangular sub-portion 542 utilizes the full extent of square image sensor pixel array 140. Accordingly, square image sensor pixel array 140, by virtue of rectangular sub-portions 412, 422, 532, and 542, facilitates generation of both portrait and landscape oriented electronic images, both of aspect ratio 16:9 and of aspect ratio 4:3, without having to reorient square image sensor pixel array 140.

FIG. 5 is not drawn to scale. Image sensor pixel array 140 may include a different number of elements 310 than indicated in FIG. 5, without departing from the scope hereof. While image circle 580 is illustrated in FIG. 5 as being centered with respect to square image sensor pixel array 140, the center of image circle 580 may be offset from the center of square image sensor pixel array 140, without departing from the scope hereof.

Figure 6:
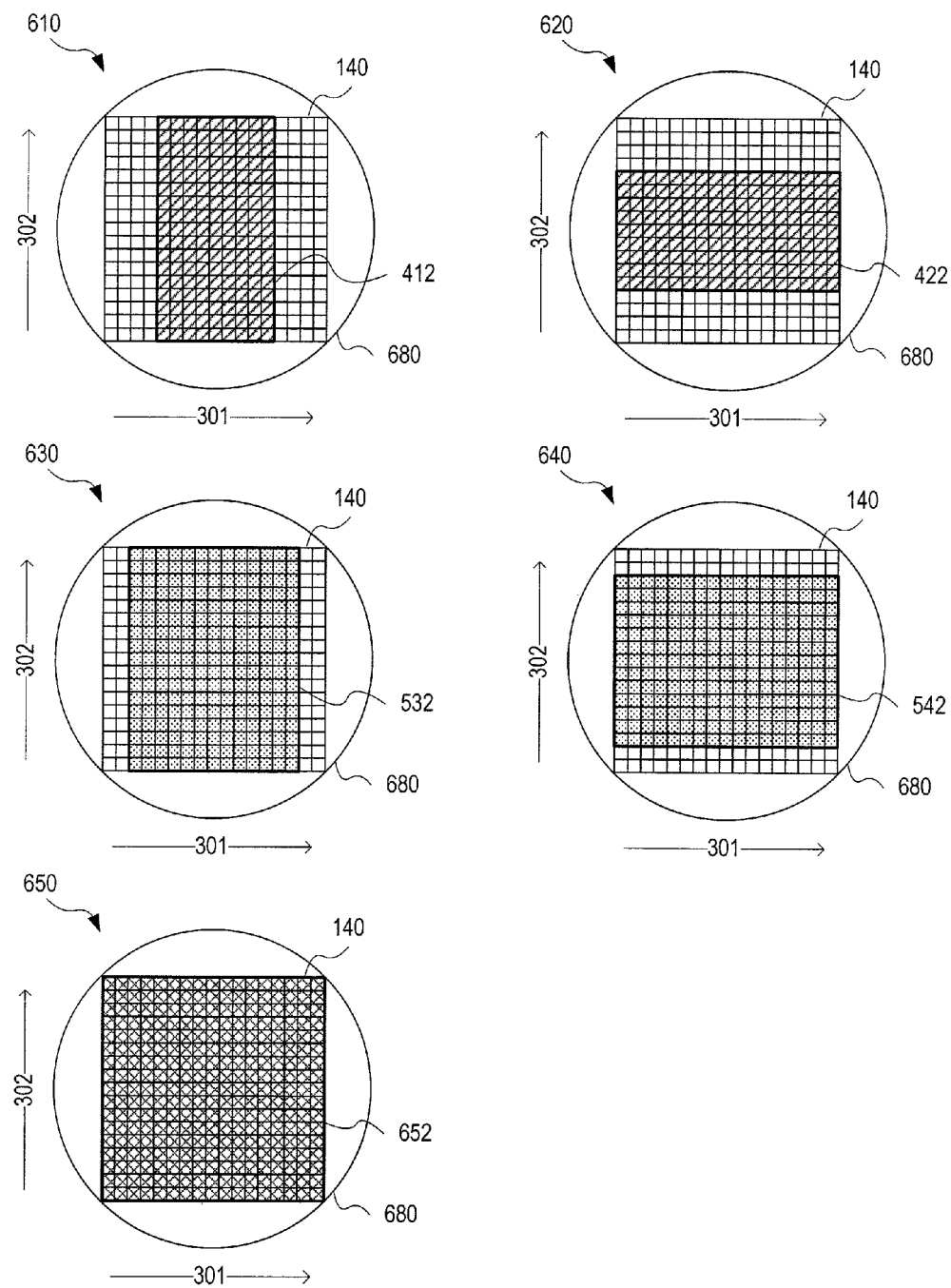
FIG. 6 illustrates how a square image sensor pixel array may provide rectangular electronic images of different orientations and of different aspect ratios, including a square electronic image utilizing all pixels of the square image sensor pixel array, according to an embodiment.

FIG. 6 illustrates an extension of the configuration illustrated in FIG. 5, wherein the image circle has been further enlarged to additionally facilitate generation of electronic images that utilize all pixels of square image sensor pixel array 140.

The configurations illustrated in diagrams 610, 620, 630, 640, and 650 may be achieved using imaging system 200 of FIG, with the properties of imaging objective 130 being selected to produce an image circle 680. Image circle 680 is larger than image circle 580 (FIG. 5). As compared to the configurations illustrated in FIG. 5, imaging objective 130, for the purpose of achieving the configurations of diagrams 610, 620, 630, 640, and 650, may have properties that produce a larger image circle.

Diagram 610 indicates rectangular sub-portion 412 (FIG. 4) of the portion of square image sensor pixel array 140 located within image circle 680. Diagram 620 indicates rectangular sub-portion 422 (FIG. 4) of the portion of square image sensor pixel array 140 located within image circle 680. Diagram 630 indicates rectangular sub-portion 532 (FIG. 5) of the portion of square image sensor pixel array 140 located within image circle 680. Diagram 640 indicates rectangular sub-portion 542 (FIG. 5) of the portion of square image sensor pixel array 140 located within image circle 680. Diagram 650 indicates a rectangular sub-portion 652 of the portion of square image sensor pixel array 140 located within image circle 680. Rectangular sub-portion 652 is square, i.e., has aspect ratio 1:1, and includes all of square image sensor pixel array 140. Accordingly, square image sensor pixel array 140, by virtue of rectangular sub-portions 412, 422, 532, 542, and 652 facilitates generation of a square electronic image based upon all of square image sensor pixel array 140, in addition to both portrait and landscape oriented electronic images, both of aspect ratio 16:9 and of aspect ratio 4:3, without having to reorient square image sensor pixel array 140.

FIG. 6 is not drawn to scale. Image sensor pixel array 140 may include a different number of elements 310 than indicated in FIG. 6, without departing from the scope hereof. While image circle 680 is illustrated in FIG. 6 as being centered with respect to square image sensor pixel array 140, the center of image circle 680 may be offset from the center of square image sensor pixel array 140, without departing from the scope hereof.

The above discussion of FIGS. 4, 5, and 6 may be extended to other and/or additional aspect ratios and sizes of the rectangular sub-portions, without departing from the scope hereof. For example, as compared to the configurations of FIG. 6, additional rectangular sub-portions may be formed to facilitate generation of landscape and portrait oriented electronic images of more than two different aspect ratios. Likewise, rectangular sub-portions may be formed to facilitate generation of smaller electronic images of the same aspect ratios as the rectangular sub-portions illustrated in FIG. 6.

While FIGS. 4, 5, and 6 illustrate increasingly larger image circles, similar results may be achieved with an image circle of a single size while using increasingly smaller embodiments of square image sensor pixel array 140. For example, square image sensor pixel array 140 may be made with smaller pixel pitch.

Figure 7:
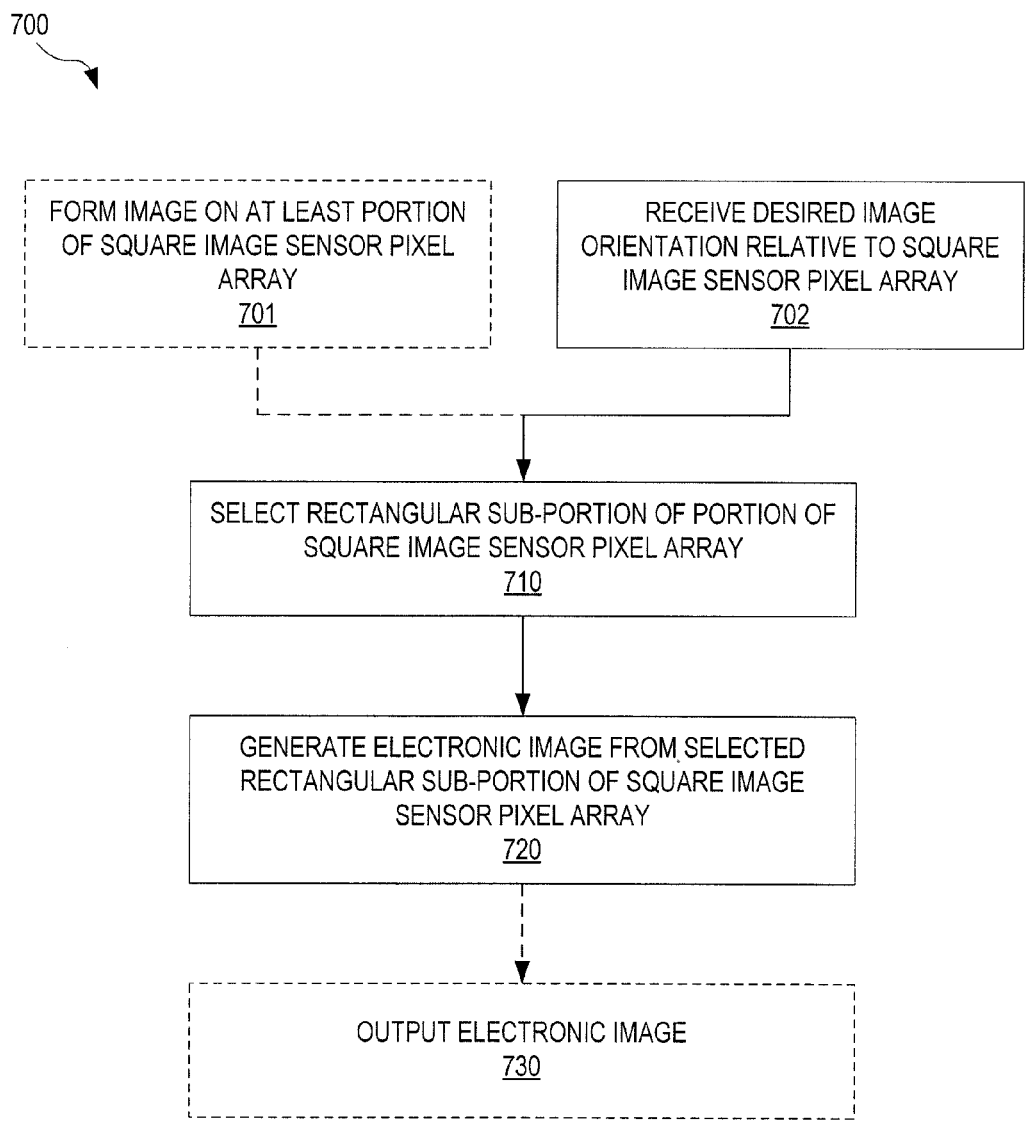
FIG. 7 illustrates a method for generating an electronic image of a desired orientation using a square image sensor pixel array, according to an embodiment.

FIG. 7 illustrates one exemplary method 700 for generating an electronic image of a desired orientation using a square image sensor pixel array. Method 700 achieves the desired image orientation without re-orienting the square image sensor pixel array. Method 700 is performed, for example, by imaging system 200 of FIG. 2.

Optionally, method 700 includes a step 701, wherein an optical image is formed on at least a portion of a square image sensor pixel array. For example, imaging objective 130 (FIGS. 1 and 2) forms an optical image on at least a portion of square image sensor pixel array 140 (FIGS. 1 and 2), where the portion is defined by an image circle as indicated by image circle 380 in FIG. 3.

In a step 702, a desired image orientation relative to the square image sensor pixel array is received. For example, processing/control module 250 (FIG. 2) receives a desired image orientation, such as landscape or portrait, from interface 260 (FIG. 2), instructions 270 (FIG. 2), or data storage 280 (FIG. 2). In certain embodiments, step 702 may receive other format parameters such as aspect ratio and/or size, either in addition to image orientation or instead of image orientation, without departing from the scope hereof. For example, processing/control module 250 (FIG. 2) may receive a desired image orientation, such as landscape or portrait, and a desired aspect ratio, such as 16:9 and 4:3, from interface 260 (FIG. 2), instructions 270 (FIG. 2), or data storage 280 (FIG. 2).

In a step 710, a rectangular sub-portion of the portion of the square image sensor pixel array, on which an optical image is formed, is selected. For example, processing/control module 250 (FIG. 2) selects a rectangular sub-portion, as illustrated in FIGS. 4, 5, and 6. Processing/control module 250 (FIG. 2) performs the selection according to instructions 270 (FIG. 2) using the image orientation, and/or other image format parameters, received in step 702. In a step 720, an electronic image is generated from the selected rectangular sub-portion of the square image sensor pixel array. For example, processing/control module 250 (FIG. 2) generates an electronic image from the rectangular sub-portion selected in step 710 according to instructions 270 (FIG. 2). In an optional step 730, the electronic image generated in step 720 is outputted. For example, processing/control module 250 (FIG. 2) outputs the electronic image via interface 260 (FIG. 2).

Figure 8:
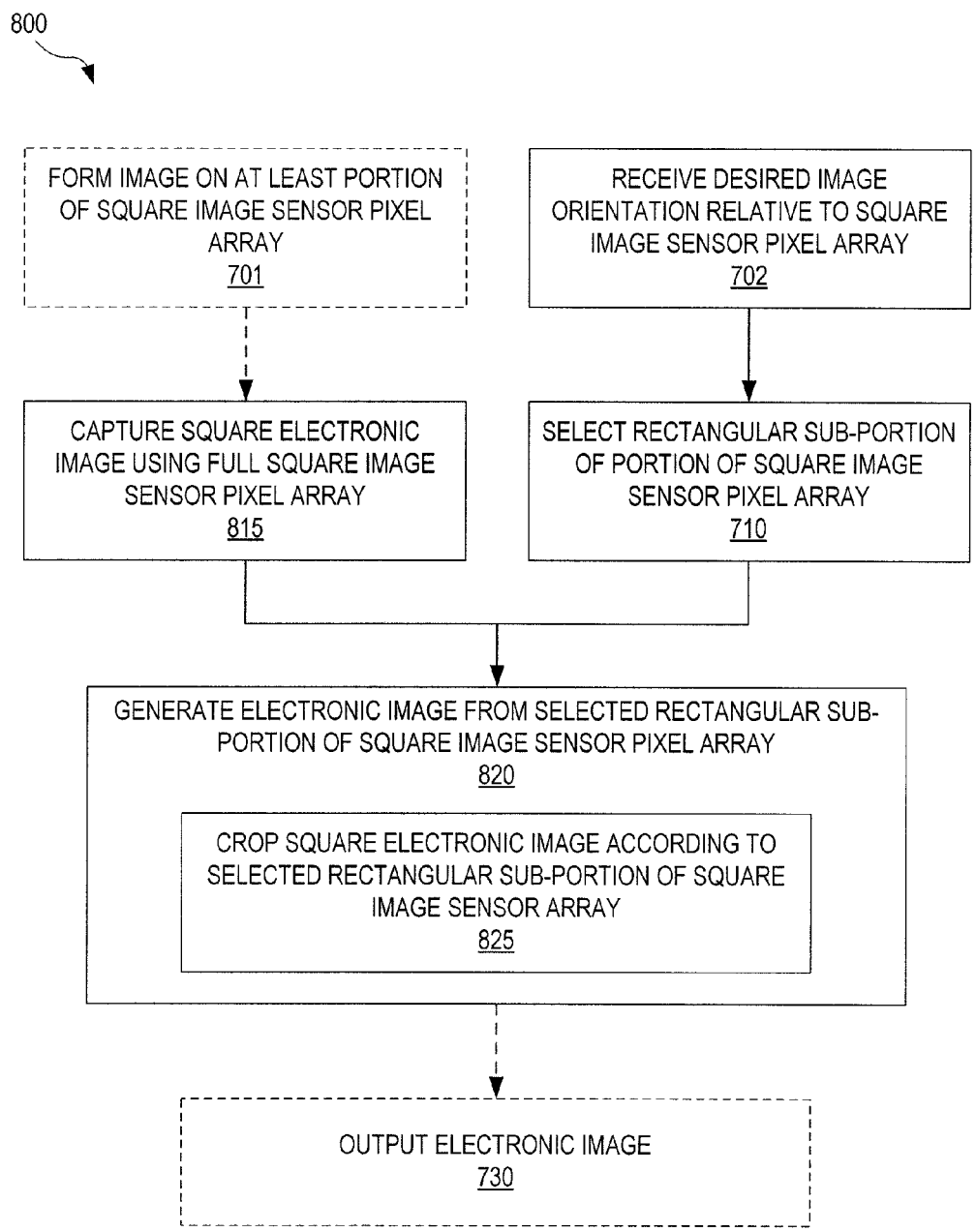
FIG. 8 illustrates an embodiment of the method of FIG. 7 that utilizes capture of a square electronic image, according to an embodiment.

FIG. 8 illustrates one exemplary method 800 for generating an electronic image of a desired orientation using square electronic image captured by a square image sensor pixel array. Method 800 is an embodiment of method 700 (FIG. 7) and may be performed by imaging system 200 of FIG. 2. Method 800 performs steps 702 and 710 of FIG. 7 in series or in parallel with a step 815. Step 815 is optionally preceded by step 701 of FIG. 7. In step 815, a square electronic image is captured using the full extent of the square image sensor pixel array. For example, a square electronic image is captured by image sensor 220 (FIG. 2) using the full extent of square image sensor pixel array 140 (FIGS. 1 and 2). Processing/control module 250 (FIG. 2) may store the square electronic image to data storage 280 (FIG. 2). In an alternate embodiment, the size of the electronic image is less than the full extent of the square image sensor pixel array, and may or may not be square. Rather, the electronic image has size and shape to include a pre-defined plurality of image sizes, aspect ratios, and orientations.

After performing steps 815 and 710, method 800 proceed to perform step 820. In step 820, an electronic image is generated from pixels of the square electronic image captured in step 815, which are associated with image sensor pixels located within the rectangular sub-portion, of the square image sensor pixel array, selected in step 710. Step 820 includes a step 825, wherein the square electronic image is cropped according to the rectangular sub-portion, of the square image sensor pixel array, selected in step 710. For example, processing/control module 250 (FIG. 2) receives, from image sensor 220 (FIG. 2) or from data storage 280, the square electronic image generated in step 815. Processing/control module 250 (FIG. 2) crops the square electronic image according to instructions 270 (FIG. 7) to include a portion of the square electronic image that corresponds to the rectangular sub-portion selected in step 710. Optionally, method 800 includes step 730 (FIG. 7).

Figure 9:
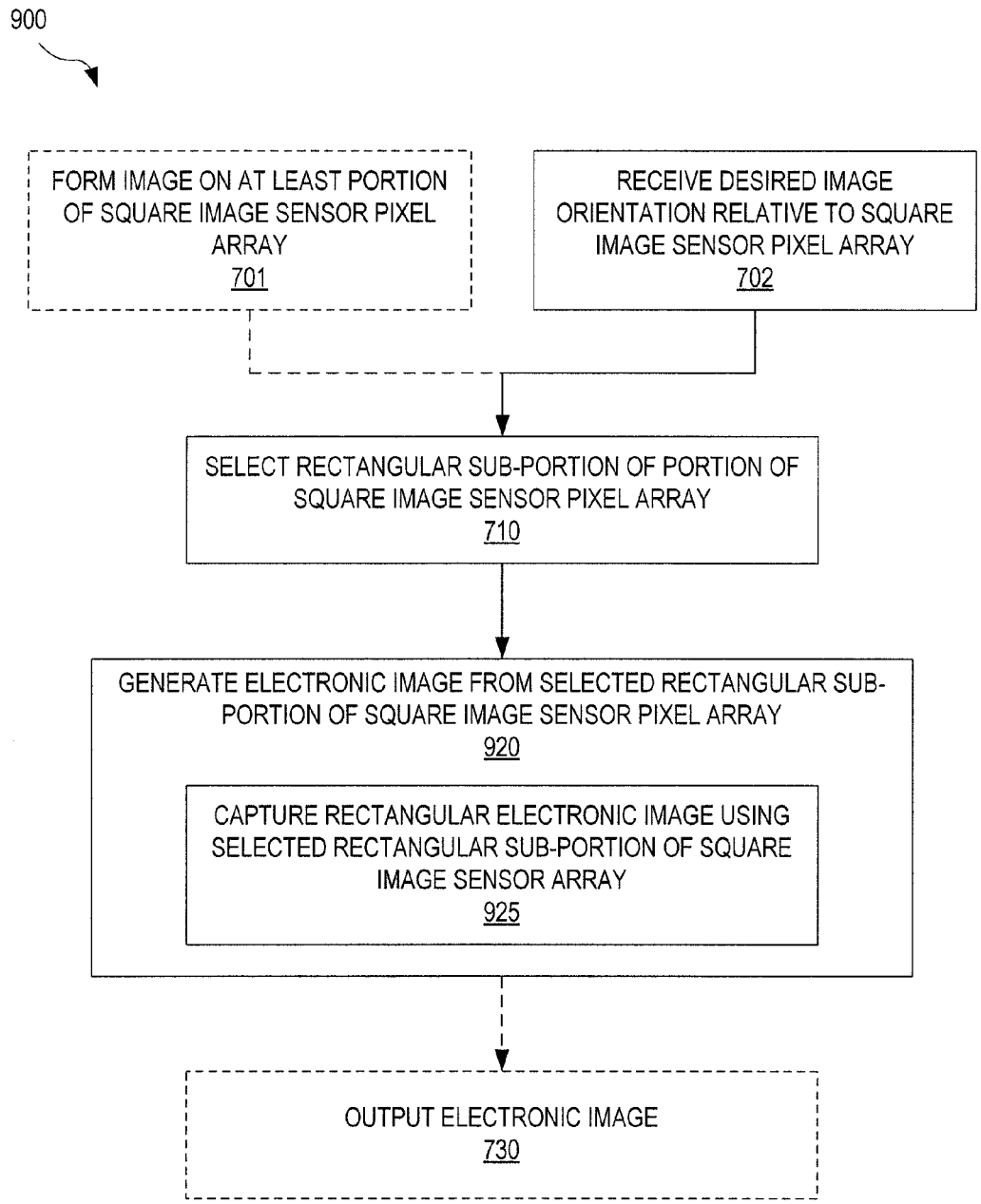
FIG. 9 illustrates an embodiment of the method of FIG. 7, wherein the electronic image is generated using a portion of the square image sensor pixel array, according to an embodiment.

FIG. 9 illustrates one exemplary method 900 for generating an electronic image of a desired orientation using a portion of a square image sensor pixel array. Method 900 is an embodiment of method 700 (FIG. 7) and may be performed by imaging system 200 of FIG. 2. Method 900 first performs steps 702, 710, and, optionally, step 701 as discussed in connection with FIG. 7. After performing step 710, method 900 proceeds to a step 920. In step 920, an electronic image is generated from the rectangular sub-portion, of the square image sensor pixel array, selected in step 710. Step 920 includes a step 925, wherein a rectangular electronic image is capture using the selected rectangular sub-portion of the square image sensor pixel array. For example, image sensor 220 (FIG. 2) captures a rectangular electronic image using pixels of square image sensor pixel array 140 (FIGS. 1 and 2) that are within the rectangular sub-portion of square image sensor pixel array 140 selected in step 710. Optionally, method 900 further includes step 730 (FIG. 7).

Figure 10:
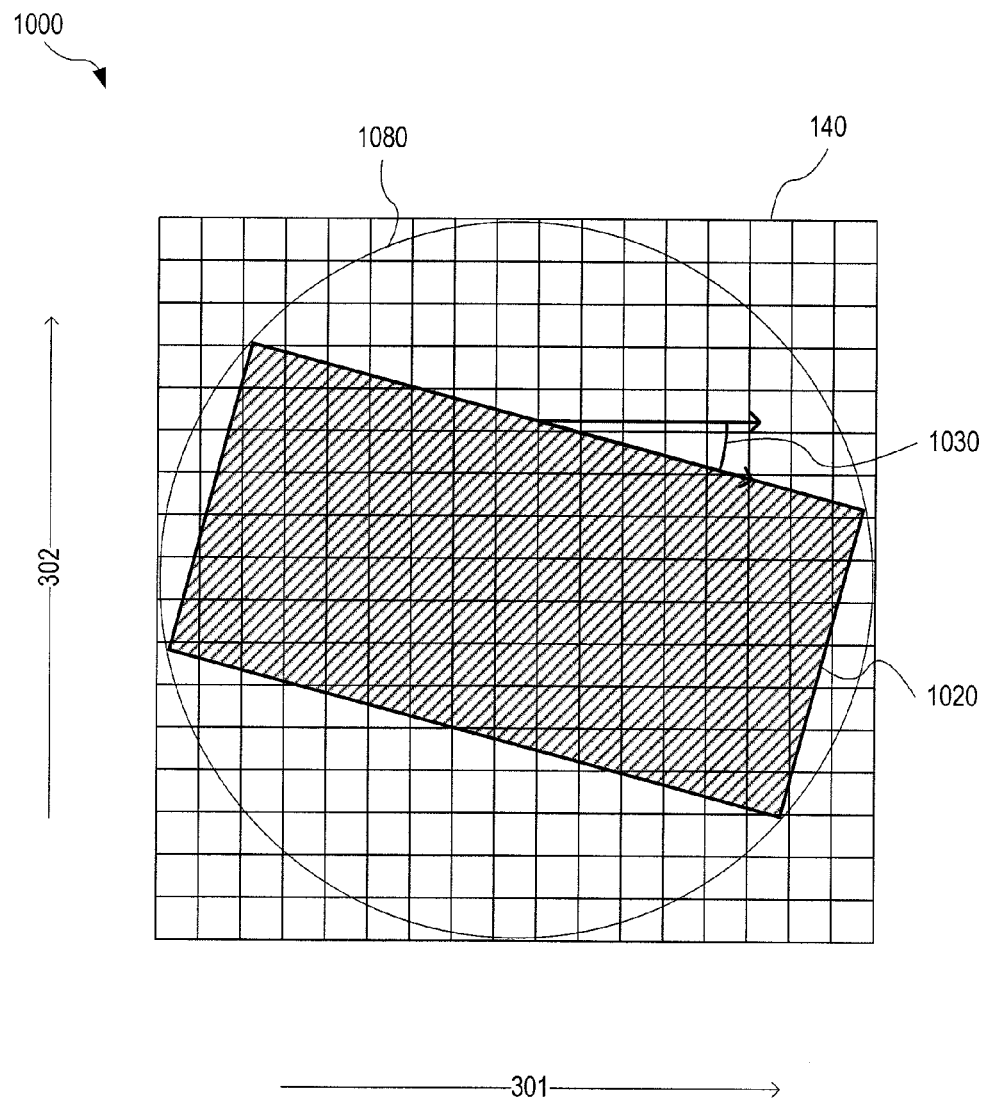
FIG. 10 illustrates a configuration capable of providing an electronic image of arbitrary rotation by using square image sensor pixel array, according to an embodiment.

FIG. 10 illustrates one exemplary configuration 1000 for obtaining an electronic image of arbitrary rotation by using square image sensor pixel array 140 (FIGS. 1 and 2). Configuration 1000 may be achieved using, for example, imaging system 200 (FIG. 2). An image circle 1080 is within the boundary of square image sensor pixel array 140 and thus includes a portion of square image sensor pixel array 140. Image circle 1080 may be achieved, for example, by appropriate choice of properties of imaging objective 130 (FIGS. 1 and 2). An electronic image of arbitrary rotation may be generated from the portion of square image sensor pixel array 140 included in a rectangular sub-portion 1020.

Rectangular sub-portion 1020 includes a sub-portion of the portion of square image sensor pixel array 140 located within image circle 1080. The longer dimension of rectangular sub-portion 1020 is oriented at an angle 1030 away from direction 301. In one embodiment, possible values of angle 1030 include zero degrees, 360 degrees and all values between zero and 360 degrees. In another embodiment, the possible values of angle 1030 include a plurality of discrete values in the range from zero to 360 degrees, where the range includes at least one of zero and 360 degrees. For example, the plurality of discrete values may be evenly distributed within the range from zero and 360 degrees. In this example, the plurality of discrete values represents the full angular range at a certain resolution. Exemplary resolutions include, but are not limited to, 0.1, 1, and 5 degrees.

Image circle 1080 may be sized and located differently from what is illustrated in configuration 1000, without departing from the scope hereof. For example, image circle 1080 may have size and location such that image circle 1080 includes all desired orientations of a rectangular sub-portion of a desired size and aspect ratio. Rectangular sub-portion 1020 may have size, aspect ratio, and location different from what is illustrated in configuration 1000, without departing from the scope hereof. In an embodiment, rectangular sub-portion 1020 has size, aspect ratio, and location such that all desired orientations, i.e., all desired values of angle 1030, of rectangular sub-portion 1020 are within image circle 1080. In an embodiment, rectangular sub-portion 1020 is square. In this embodiment, angle 1030 represents the angle between direction 301 and one side of rectangular sub-portion 1020.

FIG. 10 is not drawn to scale. Image sensor pixel array 140 may include a different number of elements than shown in FIG. 10, without departing from the scope hereof.

Figure 11:
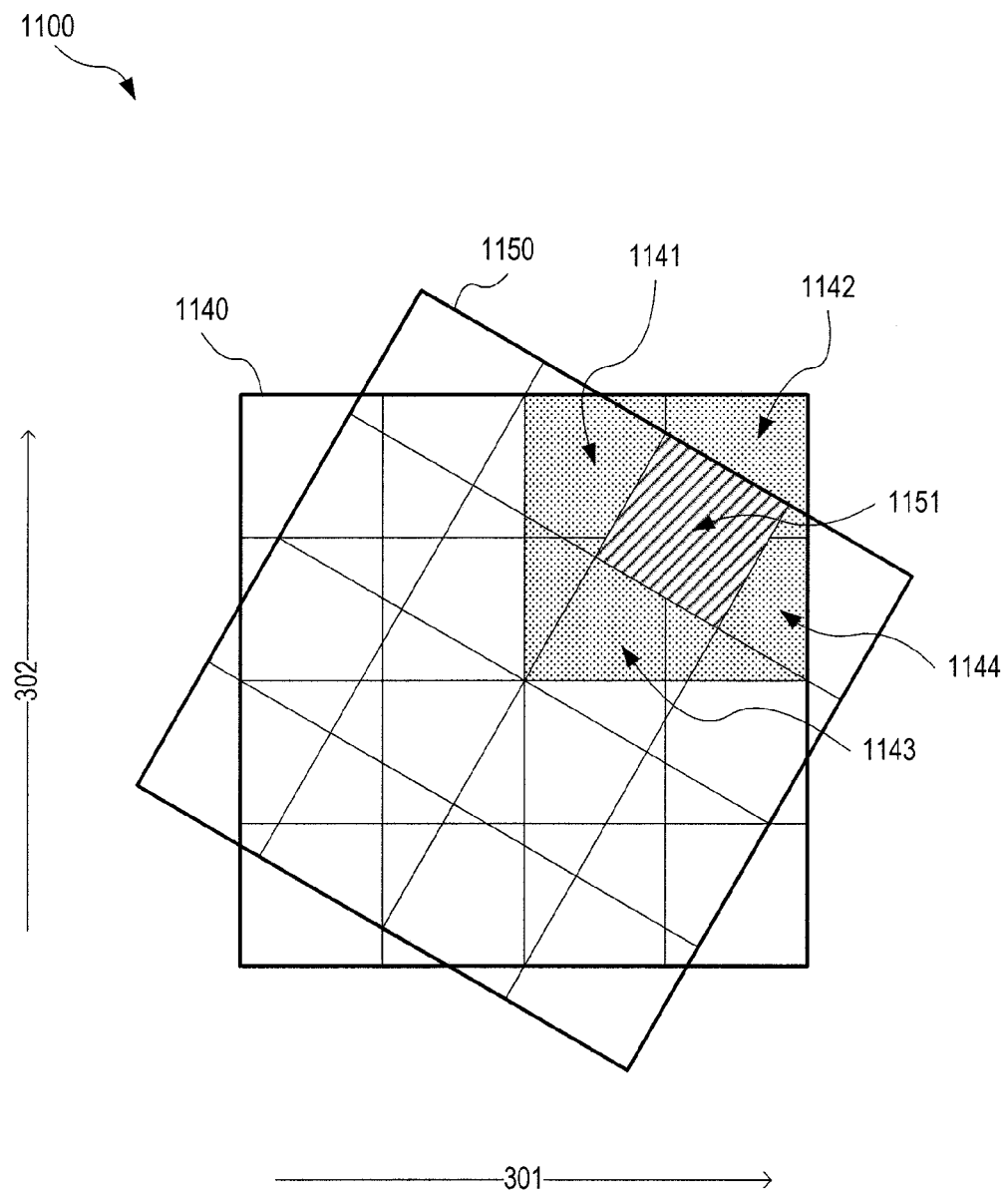
FIG. 11 is a diagram showing an electronic image portion overlaid on a portion of a square image sensor pixel array, according to an embodiment.

FIG. 11 is a diagram 1100 showing an electronic image portion 1150 overlaid on an image sensor pixel array portion 1140 of square image sensor pixel array 140 (FIGS. 1, 2, and 10). Electronic image portion 1150 is a portion of an electronic image generated from rectangular sub-portion 1020 (FIG. 10). Thus, electronic image portion 1150 is shown in FIG. 11 in the location of the portion of rectangular sub-portion 1020 (FIG. 10), from which electronic image portion 1150 is generated. The electronic image is composed of an array of pixels. Hence, electronic image portion 1150 is composed of image pixels 1151 (for clarity of illustration, only one pixel 1151 is labeled in FIG. 11). However, image pixel 1151 does not directly correspond to a single pixel of image sensor pixel array portion 1140. In the exemplary illustration in diagram 1100, pixel 1151 of electronic image portion 1150 overlaps with four pixels 1141, 1142, 1143, and 1144 of image sensor pixel array portion 1140.

Figure 12:
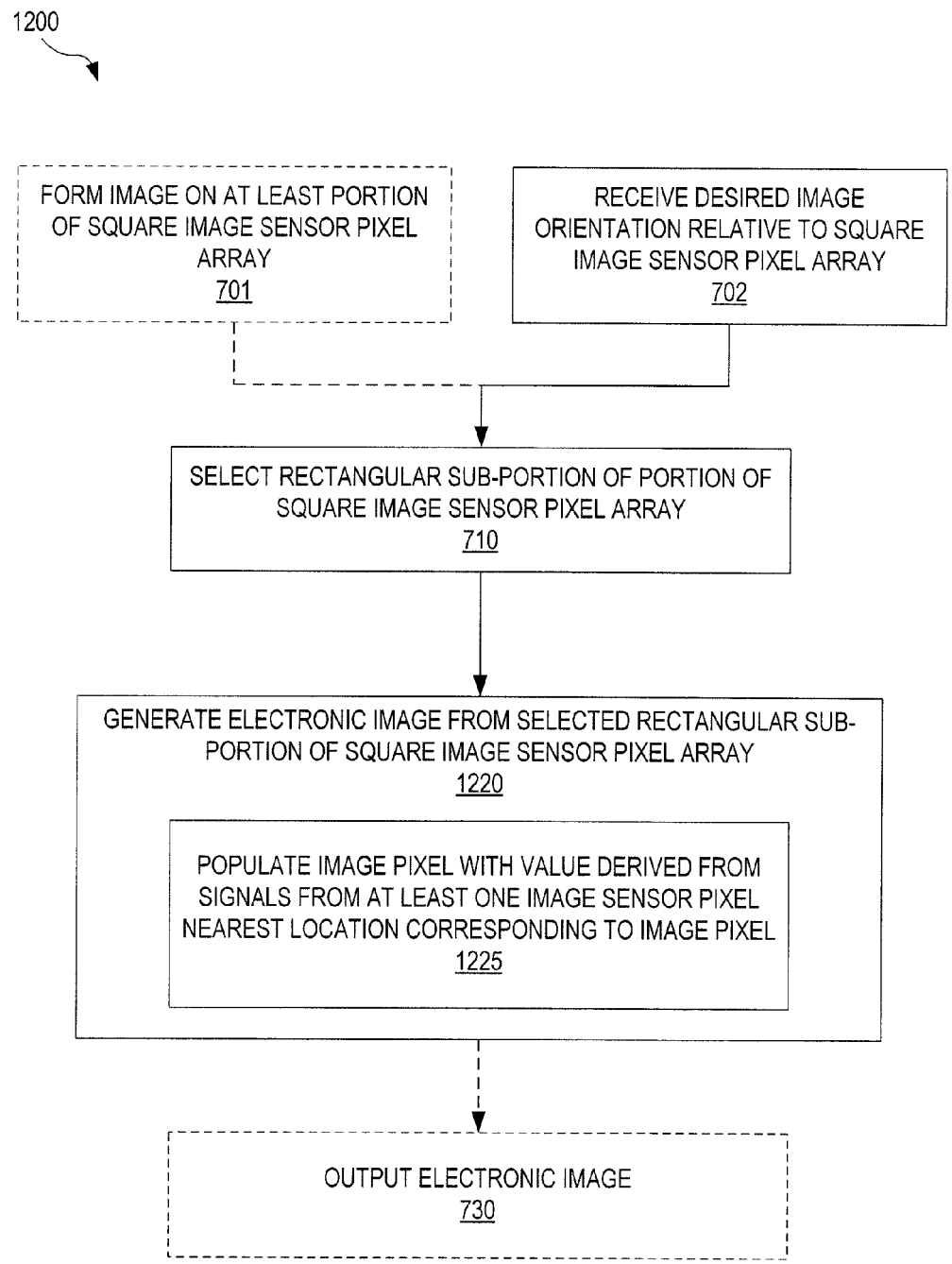
FIG. 12 illustrates a method for generating an electronic image of a desired orientation, using a square image sensor pixel array, in situations where the location of image pixels does not necessarily correspond directly to the location of image sensor pixels, according to an embodiment.

FIG. 12 illustrates one exemplary method 1200 for generating an electronic image of a desired orientation, using a square image sensor pixel array, in situations where the location of image pixels does not necessarily correspond directly to the location of image sensor pixels. Hence, method 1200 is an embodiment of method 700 (FIG. 7) and may be utilized to generate electronic images associated with configuration 1000 of FIG. 10 and diagram 1100 of FIG. 11. Method 1200 is performed, for example, by imaging system 200 of FIG. 2.

Method 1200 includes steps 702, 710, and, optionally, step 701, as discussed in connection with FIG. 12. After performing step 710, method 1200 performs a step 1220, which is an embodiment of step 720 of method 700 (FIG. 7). In step 1220, an electronic image is generated from the rectangular sub-portion, of the square image sensor pixel array, selected in step 710. Step 1220 includes a step 1225, wherein each image pixel, of the electronic image, is populated with a value derived from signals from at least one image sensor pixel, of the square image sensor pixel array, located nearest the location corresponding to the image pixel. Referring to diagram 1100 of FIG. 11, image pixel 1151 is populated with a value derived from signals from one or more of image sensor pixels 1141, 1142, 1143, and 1144. In one embodiment, the value is derived using all image sensor pixels that overlap with the location of the image pixel. For example, image pixel 1151 is populated with a value derived using all of image sensor pixels 1141, 1142, 1143, and 1144, such as a value representative of an average or weighted average of signals from image sensor pixels 1141, 1142, 1143, and 1144. In the case of a weighted average, the weight associated with each of image sensor pixels 1141, 1142, 1143, and 1144 may be proportional to the overlap between image pixel 1151 and the respective image sensor pixel. In another embodiment, the value is derived from the image sensor pixel having the greatest overlap with the location of the image pixel. For example, image pixel 1151 is populated with a value derived from the signal from image sensor pixel 1142, since this is the image sensor pixel having the greatest overlap with image pixel 1151. Step 1220 is performed, for example, by processing/control module 250 (FIG. 2) according to instructions 270 (FIG. 2). Optionally, method 1200 includes step 730 (FIG. 7).

Step 1225 may be incorporated into step 820 of method 800 (FIG. 8) and step 920 of method 900 (FIG. 9), without departing from the scope hereof.

Figure 13:
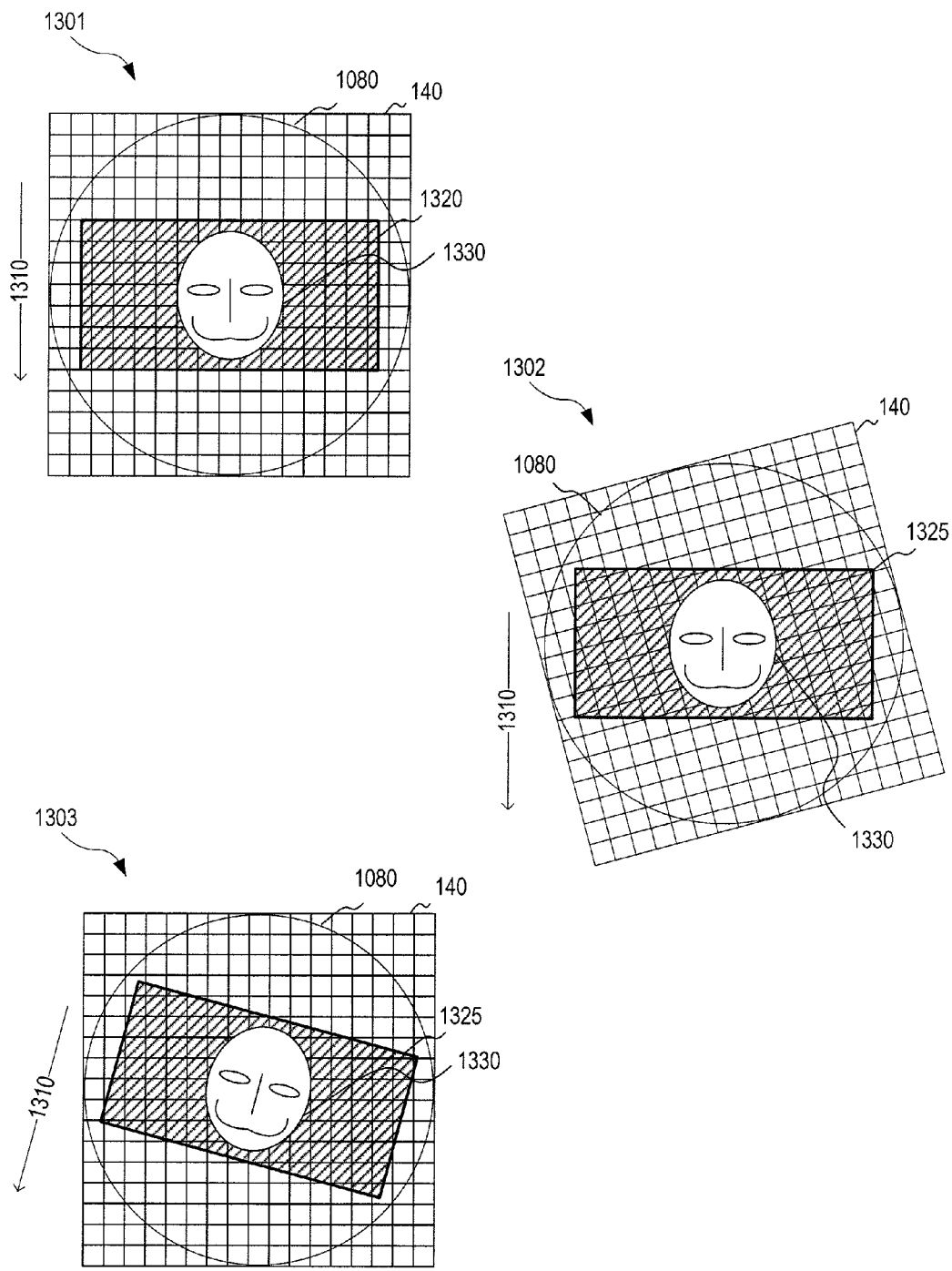
FIG. 13 illustrates how a square image sensor pixel array may facilitate the generation of an orientation-stabilized image, according to an embodiment.

FIG. 13 shows, in one exemplary embodiment illustrated by diagrams 1301, 1302, and 1303, how square image sensor pixel array 140 (FIGS. 1 and 2) may facilitate the generation of an orientation-stabilized image. All of diagrams 1301, 1302, and 1303 illustrate square image sensor pixel array 140 (FIGS. 1, 2, and 10) and image circle 1080 (FIG. 10), configured according to configuration 1000 (FIG. 10).

In diagram 1301, square image sensor pixel array 140 is oriented to have a side parallel to a reference direction 1310. Reference direction is, for example, the direction of gravity. An optical image 1330 is formed within a rectangular sub-portion 1320 of the portion of square image sensor pixel array 140 located within image circle 1080. Rectangular sub-portion 1320 is an embodiment of rectangular sub-portion 1020 (FIG. 10). In diagram 1302, square image sensor pixel array 140 has been rotated to be an angle relative to direction 1310. However, the orientation of optical image 1330 is unchanged with respect to direction 1301. A rectangular sub-portion 1325 relates to optical image 1330 in diagram 1302 in the same fashion as rectangular sub-portion 1320 relates to optical image 1330 in diagram 1301. However, due to the orientation change of square image sensor pixel array 140 from diagram 1301 to diagram 1302, rectangular sub-portion 1325 includes a different portion of square image sensor pixel array 140 than rectangular sub-portion 1320. Diagram 1303 illustrates the same configuration as diagram 1302, now viewed in the reference frame of square image sensor pixel array 140. Together, diagrams 1301 and 1302 illustrate the changing orientation of optical image 1330 with respect to square image sensor pixel array 140. Diagrams 1301 and 1302 further illustrate that two different rectangular sub-portions, i.e., rectangular sub-portions 1320 and 1325, are used to generate two identically oriented electronic images representative of optical image 1330.

Figure 14:
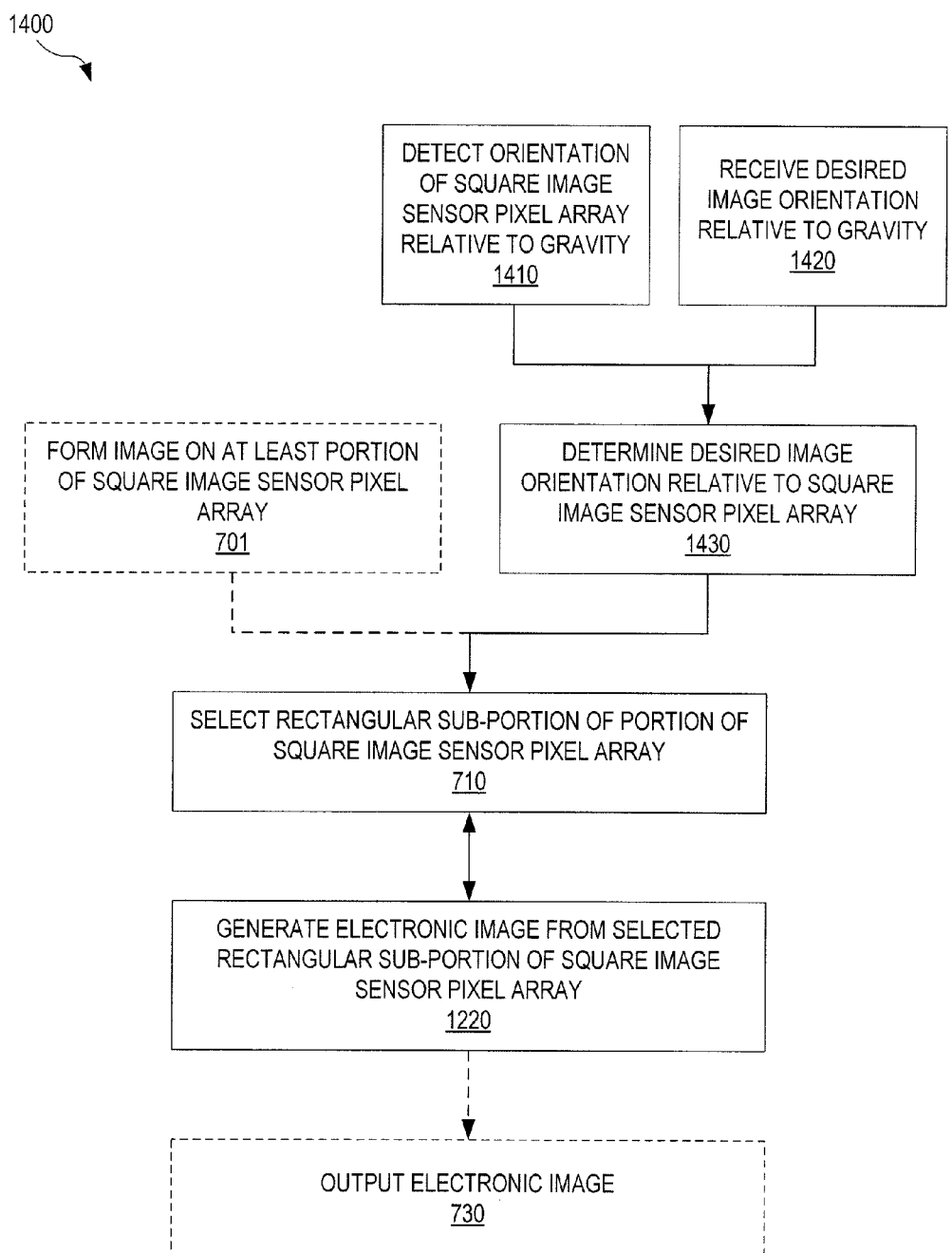
FIG. 14 illustrates a method for generating an orientation-stabilized electronic image using a square image sensor pixel array and a gravitational orientation sensor, according to an embodiment.

FIG. 14 illustrates one exemplary method 1400 for generating an orientation-stabilized electronic image by utilizing a square image sensor pixel array and a gravitational orientation sensor. Method 1400 is performed, for example, by an embodiment of imaging system 200 (FIG. 2) that includes gravitational orientation sensor 170 (FIGS. 1 and 2).

In a step 1410, the orientation of the square image sensor pixel array relative to gravity, i.e., the gravitational orientation of the square image sensor pixel array, is detected. In one embodiment, the gravitational orientation sensor is capable of determining the gravitational orientation of the square image sensor pixel array. For example, gravitational orientation sensor 170 (FIGS. 1 and 2) detects the gravitational orientation of square image sensor pixel array 140 (FIGS. 1 and 2). In another embodiment, the gravitational orientation sensor detects the gravitational orientation of itself or another portion of the image system, into which the gravitational orientation sensor is incorporated. The gravitational orientation detected by the gravitational orientation sensor is then processed to determine the gravitational orientation of the square image sensor pixel array. For example, gravitational orientation sensor 170 (FIGS. 1 and 2) detects the gravitational orientation of itself and communicates this gravitational orientation to processing/control module 250 (FIG. 2). Processing/control module 250 (FIG. 2) derives the gravitational orientation of square image sensor pixel array 140 from the gravitational orientation of gravitational sensor 170 (FIGS. 1 and 2) according to instructions 270 (FIG. 2). Instructions 270 (FIG. 2) may, for this purpose, include information about structural relationships between gravitational orientation sensor 170 (FIGS. 1 and 2) and square image sensor pixel array 140 (FIGS. 1 and 2). Either of these two embodiments of step 1410 may determine the angle between square image sensor pixel array 140 and direction 1310, as illustrated in diagram 1302 of FIG. 13.

In a step 1420, a desired image orientation, relative to gravity, is received. For example, processing/control module 250 (FIG. 2) receives a desired gravitational image orientation, such as landscape or portrait, from interface 260 (FIG. 2) or from instructions 270 (FIG. 2). In a step 1430, the desired orientation of the electronic image, relative to the square image sensor pixel array, is determined. This orientation is determined from the detected gravitational orientation of the square image sensor pixel array, obtained in step 1410, and the desired image orientation with respect to gravity, obtained in step 1420. For example, processing/control module 250 (FIG. 2) determines the desired orientation of the electronic image, according to instructions 270 (FIG. 2) and using input from steps 1410 and 1420.

Optionally, step 701 of method 700 (FIG. 7) is performed in parallel or series with steps 1410, 1420, and 1430. After performing step 1430, method 1400 performs step 710. For example, processing/control module 250 (FIG. 2) selects rectangular sub-portion 1325 (FIG. 13) of square image sensor pixel array 140 (FIGS. 1 and 2), as illustrated in diagram 1303 of FIG. 13. Next, method 1400 performs step 1220 of method 1200 (FIG. 12). In an alternate embodiment of method 1400, step 1220 (FIG. 12) is replaced by step 720 of method 700 (FIG. 7). Optionally, method 1400 further includes step 730 of method 700 (FIG. 7).

Figure 15:
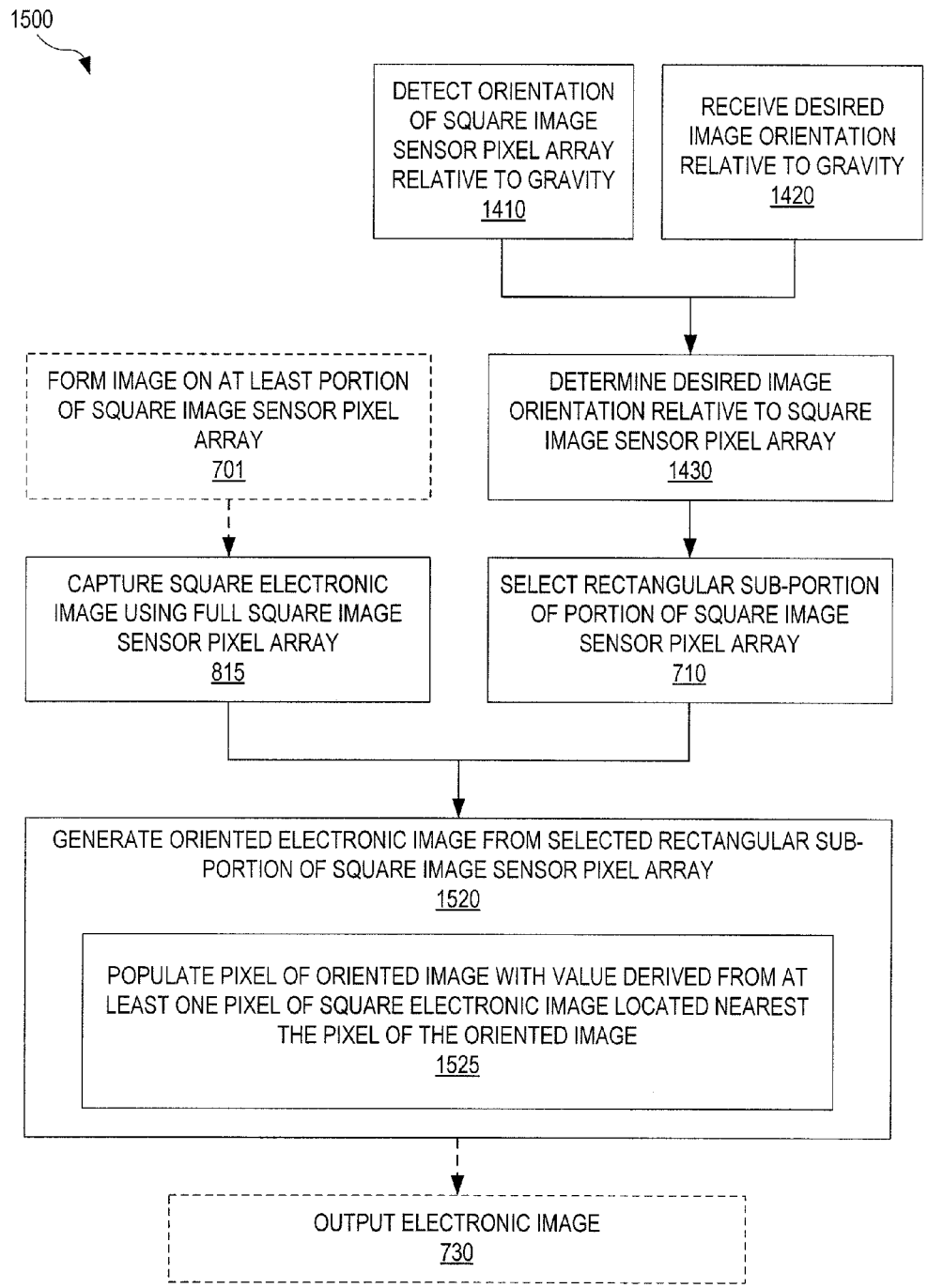
FIG. 15 illustrates an embodiment of the method of FIG. 14 that utilizes capture of a square electronic image, according to an embodiment.

FIG. 15 illustrates one exemplary method 1500 for generating an orientation-stabilized electronic image by utilizing square electronic images captured by a square image sensor pixel array, together with a gravitational orientation sensor. Method 1500 is an embodiment of method 1400 of FIG. 14. Method 1500 performs steps 1410 (FIG. 14), 1420 (FIG. 14), 1430 (FIG. 14), and 710 (FIG. 7) as discussed in connection with FIG. 14. In parallel or series therewith, method 1500 performs step 815 (FIG. 8). Optionally, step 815 (FIG. 8) is preceded by step 701 (FIG. 7).

After performing steps 815 and 710, method 1500 performs a step 1520. In step 1520, an oriented electronic image is generated from pixels of the square electronic image captured in step 815, which are associated with image sensor pixels located within the rectangular sub-portion, of the square image sensor pixel array, selected in step 710. Step 1520 includes a step 1525, wherein each image pixel of the oriented electronic image is populated with a value derived from at least one pixel of the square electronic image located nearest the pixel of the oriented image. Referring to diagram 1100 of FIG. 11, portion 1140 may be interpreted as a portion of the square electronic image captured in step 815. A pixel of the oriented image may be populated in a manner similar to the manner in which image pixel 1151 is populated using values associated with one or more of image sensor pixels 1141, 1142, 1143, and 1144, as discussed in connection with FIG. 11. For example, processing/control module 250 (FIG. 2) receives, from image sensor 220 (FIG. 2) or from data storage 280, the square electronic image generated in step 815. Processing/control module 250 (FIG. 2) populates, according to instructions 270 (FIG. 2), each pixel of the oriented electronic image with values derived from at least one pixel, of the square electronic image, located nearest the pixel of the oriented image, wherein each pixel of the oriented electronic image has location corresponding to a location within the rectangular sub-portion. Optionally, method 1500 further includes step 730 (FIG. 7).

Figure 16:
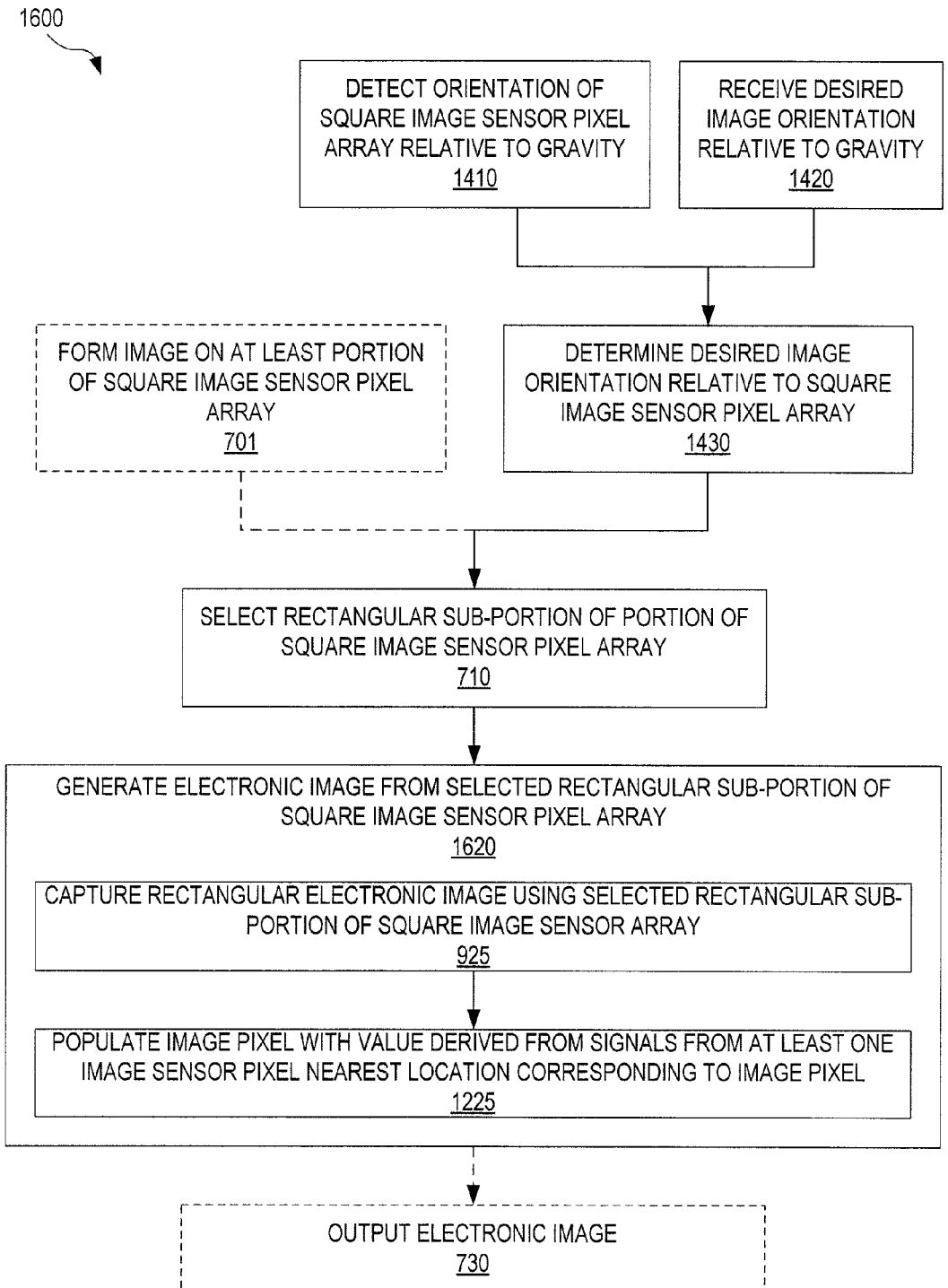
FIG. 16 illustrates an embodiment of the method of FIG. 14, wherein the orientation-stabilized electronic image is generated using a portion of the square image sensor pixel array, according to an embodiment.

FIG. 16 illustrates one exemplary method 1600 for generating an orientation-stabilized electronic image by utilizing a portion of a square image sensor pixel array and a gravitational orientation sensor. Method 1600 is an embodiment of method 1400 (FIG. 14). Method 1600 performs steps 1410 (FIG. 14), 1420 (FIG. 14), 1430 (FIG. 14), 710 (FIG. 7), and, optionally, step 701 (FIG. 7), as discussed in connection with FIG. 14. After performing step 710, method 1600 performs a step 1620, wherein an electronic image is generated from the rectangular sub-portion of the square image sensor pixel array selected in step 710. Step 1620 includes sequential steps 925 (FIG. 9) and 1225 (FIG. 12). Optionally, method 1600 further includes step 730 (FIG. 7).

Figure 17:
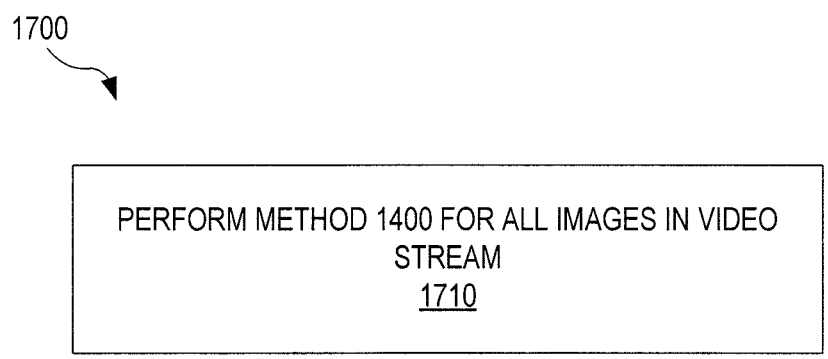
FIG. 17 illustrates a method for generating an orientation-stabilized electronic image series, according to an embodiment.

FIG. 17 illustrates one exemplary method 1700 for generating an orientation-stabilized electronic image series, such as a video. In a step 1710, method 1400 of FIG. 14 is performed, as discussed in connection with FIG. 14, for all electronic images in the electronic image series. In an embodiment, method 1400 is performed according to the embodiment thereof, method 1500 (FIG. 15). In another embodiment, method 1400 is performed according to the embodiment thereof, method 1600 (FIG. 16).

Combinations of Features

Features described above as well as those claimed below may be combined in various ways without departing from the scope hereof. For example, it will be appreciated that aspects of one image system or method using a square image sensor for flexible image orientation described herein may incorporate or swap features of another image system or method using a square image sensor for flexible image orientation described herein. The following examples illustrate possible, non-limiting combinations of embodiments described above. It should be clear that many other changes and modifications may be made to the methods and device herein without departing from the spirit and scope of this invention:

(A) An imaging system for generating flexibly oriented electronic images may include an image sensor having a square pixel array and imaging optics for forming an optical image on at least a portion of the square pixel array, the portion being within an image circle of the imaging optics and the portion including at least two rectangular sub-portions differing from each other in at least one of aspect ratio and orientation.

(B) The imaging system denoted as (A) may further include a processing module capable of generating an electronic image from each of the at least two rectangular sub-portions.

(C) In the imaging systems denoted as (A) and (B), the at least two rectangular sub-portions may include a first sub-portion having aspect ratio a:b, where a is different from b, and a second sub-portion having size and aspect ratio identical to the first sub-portion and orientation orthogonal to the first sub-portion.

(D) In the imaging system denoted as (C), the square pixel array may include N×N pixels.

(E) In the imaging system denoted as (D), the first and second sub-portions may have sides parallel with sides of the square pixel array.

(F) In the imaging system denoted as (E), the first sub-portion may include columns of N pixels parallel to a first side of the square pixel array.

(G) In the imaging system denoted as (F), the second sub-portion may include rows of N pixels, wherein the rows are orthogonal to the columns.

(H) In the imaging systems denoted as (C) through (G), the at least two rectangular sub-portions may further include a third sub-portion having aspect ratio c:d, where c is different from d and c/d is different from a/b.

(I) In the imaging system denoted as (H), the at least two rectangular sub-portions may further include a fourth sub-portion having size and aspect ratio identical to and orientation orthogonal to the third sub-portion.

(J) In the imaging system denoted as (I), the first, second, third, and fourth sub-portions may have sides parallel with sides of the square pixel array.

(K) In the imaging system denoted as (J), the first and third sub-portions may include columns of N pixels parallel to a first side of the square pixel array, and the second and fourth sub-portions may include rows of N pixels, the rows being orthogonal to the columns.

(L) In the imaging systems denoted as (A) through (K), the at least two rectangular sub-portions may include a square sub-portion that has aspect ratio 1:1.

(M) In the imaging system denoted as (L), the square sub-portion may include all pixels of the square pixel array.

(O) The imaging systems denoted as (B) through (M) may further include a gravitational orientation sensor for detecting gravitational orientation of the imaging system relative to gravity.

(P) In the imaging system denoted as (O), the at least two rectangular sub-portions may include a plurality of sub-portions having aspect ratio a:b and mutually different orientations.

(Q) In the imaging system denoted as (P), the processing module may be capable of selecting one of the plurality of sub-portions, according to the gravitational orientation, such that the electronic image reflects a desired orientation relative to gravity.

(R) In the imaging systems denoted as (P) and (Q), the plurality of sub-portions may include all possible orientations of sub-portions having aspect ratio a:b.

(S) The imaging systems denoted as (A) through (R) may be implemented in a handheld camera.

(T) An imaging method for generating electronic images of flexible orientation using a square image sensor pixel array may include forming an optical image on at least a portion of the square image sensor pixel array and selecting, according to a desired orientation, a rectangular sub-portion of the at least a portion of the square image sensor pixel array.

(U) The method denoted as (T) may further include generating a final electronic image from the sub-portion.

(V) In the method denoted as (U), the step of selecting may include selecting a rectangular sub-portion of the at least a portion of the square image sensor pixel array, wherein the rectangular sub-portion has sides parallel with sides of the square image sensor pixel array.

(W) In the methods denoted as (T) through (U), the step of selecting a rectangular sub-portion may include selecting a rectangular sub-portion from a set of a landscape-oriented sub-portion and a portrait-oriented sub-portion.

(X) In the methods denoted as (T) through (W), the step of selecting may include selecting the rectangular sub-portion, of the at least a portion of the square image sensor pixel array, according to the desired orientation and an aspect ratio.

(Y) The methods denoted as (T) through (X) may further include a step of receiving the desired orientation.

(Z) In the methods denoted as (T) through (Y), the step of selecting may be performed by a processing module.

(AA) The methods denoted as (T) through (Z) may further include a step of determining gravitational orientation of the square image sensor pixel array using a gravitational orientation sensor.

(AB) The methods denoted as (T), (U), and (X) through (Z), may further include a step of determining gravitational orientation of the square image sensor pixel array using a gravitational orientation sensor, and the step of selecting may include selecting, according to a desired orientation relative to the gravitational orientation, a rectangular sub-portion of the at least a portion of the square image sensor pixel array.

(AC) The method denoted as (AB) may further include generating a final electronic image from the sub-portion.

(AD) In the method denoted as (AC), the step of generating may include populating each pixel of the final electronic image with values associated with signals from at least one of pixels of the square image sensor pixel array located nearest a location corresponding to the pixel of the final electronic image.

(AE) In the methods denoted as (T) through (AD), the electronic images may be a video stream.

(AF) In the methods denoted as (AC) and (AD), the electronic images may be a video stream, and the methods may include repeating the steps of determining, forming, selecting, and generating for each of the electronic images in the video stream to produce an orientation-stabilized video stream.

(AG) The methods denoted as (U), (V), and (AC) through (AF) may further include, prior to the step of generating, a step of capturing a square electronic image.

(AH) The methods denoted as (T) and (W) through (AB) may further include generating a final electronic image from the sub-portion, and a step, prior to the step of generating, of capturing a square electronic image.

(AI) In the methods denoted as (AG) and (AH), the step of generating may include cropping the square electronic image in accordance with the rectangular sub-portion selected in the step of selecting.

(AJ) In the methods denoted as (U), (V), and (AC) through (AF), the step of generating may include capturing a rectangular image using the rectangular sub-portion selected in the step of selecting.

(AK) The methods denoted as (T) through (AJ) may be implemented in a handheld camera.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and device, which, as a matter of language, might be said to fall therebetween.

What is claimed is:

1. An imaging system for generating flexibly oriented electronic images, comprising:
   a mobile phone including:
   (a) an image sensor having a square pixel array;
   (b) imaging optics for forming an optical image on at least a portion of the square pixel array, the at least a portion being within an image circle of the imaging optics and the at least a portion including a plurality of rectangular sub-portions of mutually different orientations including at least one orientation that is not squarely aligned with the square pixel array; and
   (c) a processing module capable of generating an electronic image from any of the plurality of rectangular sub-portions, wherein the processing module is configured to, for each pixel of the electronic image and when a rectangular sub-portion is not squarely aligned with the square pixel array, populate the each pixel of the electronic image with values associated with signals from at least one pixel of the square pixel array located nearest a location corresponding to the each pixel of the electronic image.

2. The imaging system of claim 1, the rectangular sub-portions including a first sub-portion having aspect ratio a:b, where a is different from b, and a second sub-portion having size and aspect ratio identical to the first sub-portion and orientation orthogonal to the first sub-portion.

3. The imaging system of claim 2, the square pixel array comprising N×N pixels, the first and second sub-portions having sides parallel with sides of the square pixel array, the first sub-portion including columns of N pixels parallel to a first side of the square pixel array, and the second sub-portion including rows of N pixels, the rows being orthogonal to the columns.

4. The imaging system of claim 2, the rectangular sub-portions further including a third sub-portion having aspect ratio c:d, where c is different from d and c/d is different from a/b, and a fourth sub-portion having size and aspect ratio identical to and orientation orthogonal to the third sub-portion.

5. The imaging system of claim 4, the first, second, third, and fourth sub-portions having sides parallel with sides of the square pixel array, the first and third sub-portions including columns of N pixels parallel to a first side of the square pixel array, and the second and fourth sub-portions including rows of N pixels, the rows being orthogonal to the columns.

6. The imaging system of claim 2, the rectangular sub-portions further including a third sub-portion having aspect ratio 1:1, the third sub-portion including all pixels of the square pixel array.

7. The imaging system of claim 1, the mobile phone further comprising a gravitational orientation sensor for detecting gravitational orientation of the imaging system relative to gravity, and wherein the processing module is capable of selecting any one of the plurality of rectangular sub-portions, according to the gravitational orientation, such that the electronic image reflects a desired orientation relative to gravity.

8. The imaging system of claim 7, the plurality of rectangular sub-portions including a discrete set of rectangular sub-portions evenly distributed throughout range from 0 to 360 degrees and including at least one rectangular sub-portion not squarely aligned with the square pixel array.

9. An imaging method for generating electronic images of flexible orientation using a square image sensor pixel array, comprising:
onboard a mobile phone, forming an optical image on at least a portion of the square image sensor pixel array;
selecting, according to a desired orientation and from a set of mutually different orientations, a rectangular sub-portion of the at least a portion of the square image sensor pixel array, the set of mutually different orientations including at least one orientation that is not squarely aligned with the square image sensor pixel array; and
generating a final electronic image from the rectangular sub-portion, said generating including for each pixel of the final electronic image, when the rectangular sub-portion is not squarely aligned with the square pixel array, populating the pixel of the final electronic image with values associated with signals from at least one pixel of the square image sensor pixel array located nearest a location corresponding to the pixel of the final electronic image.

10. The method of claim 9, said selecting comprising selecting a rectangular sub-portion of the at least a portion of the square image sensor pixel array, the rectangular sub-portion having sides parallel with sides of the square image sensor pixel array.

11. The method of claim 10, said selecting a rectangular sub-portion comprising selecting a rectangular sub-portion from a set of a landscape-oriented sub-portion and a portrait-oriented sub-portion.

12. The method of claim 9, said selecting comprising selecting the rectangular sub-portion, of the at least a portion of the square image sensor pixel array, according to the desired orientation.

13. The method of claim 9, further comprising receiving the desired orientation.

14. The method of claim 13, said selecting being performed by a processing module using the desired orientation received in said receiving.

15. The method of claim 9, further comprising determining gravitational orientation of the square image sensor pixel array using a gravitational orientation sensor implemented onboard the mobile phone, the step of selecting comprising selecting, according to a desired orientation relative to the gravitational orientation, the rectangular sub-portion of the at least a portion of the square image sensor pixel array, the rectangular sub-portion being non-square with the square image sensor pixel array.

16. The method of claim 15, the electronic images being a video stream, the method comprising repeating said determining, forming, selecting, and generating for each of the electronic images in the video stream to produce an orientation-stabilized video stream.

17. The method of claim 9, further comprising, prior to said generating, capturing a square electronic image, said generating comprising cropping the square electronic image in accordance with the rectangular sub-portion selected in said selecting.

18. The method of claim 9, said generating comprising capturing a rectangular image using the rectangular sub-portion selected in said selecting.

19. The method of claim 9, said selecting further comprising selecting the rectangular sub-portion according to a desired one of a plurality of mutually different aspect ratios.

20. The method of claim 19, said selecting comprising selecting the rectangular sub-portion according to any combination of (a) the desired one of a plurality of mutually different aspect ratios and (b) the desired orientation.

21. The system of claim 1, the processing module further being capable of, for each one of the mutually different orientations, generating the electronic image with a plurality of mutually different aspect ratios.

* * * * *